United States Patent
Wang et al.

(10) Patent No.: US 12,185,405 B2
(45) Date of Patent: Dec. 31, 2024

(54) MAC CE FORMAT FOR SIDELINK TCI

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Yan Zhou, San Diego, CA (US); Hong Cheng, Basking Ridge, NJ (US); Jelena Damnjanovic, Del Mar, CA (US); Peter Gaal, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 17/451,309

(22) Filed: Oct. 18, 2021

(65) Prior Publication Data

US 2023/0119853 A1 Apr. 20, 2023

(51) Int. Cl.
*H04W 76/20* (2018.01)
*H04W 72/044* (2023.01)
*H04W 72/20* (2023.01)
*H04W 80/02* (2009.01)
*H04W 92/18* (2009.01)

(52) U.S. Cl.
CPC ......... *H04W 76/20* (2018.02); *H04W 72/044* (2013.01); *H04W 72/20* (2023.01); *H04W 80/02* (2013.01); *H04W 92/18* (2013.01)

(58) Field of Classification Search
CPC ... H04W 76/20; H04W 72/044; H04W 72/20; H04W 80/02; H04W 92/18; H04W 72/40; H04W 76/14; H04L 5/001; H04L 5/0023; H04L 5/0053; H04B 7/06954
See application file for complete search history.

(56) References Cited

U.S. PATENT DOCUMENTS

| | | | |
|---|---|---|---|
| 2018/0220439 A1* | 8/2018 | Lee | H04W 72/23 |
| 2021/0314974 A1* | 10/2021 | Miao | H04W 72/046 |
| 2022/0330038 A1* | 10/2022 | Ganesan | H04W 52/10 |
| 2024/0022305 A1* | 1/2024 | Raghavan | H04B 7/0695 |

FOREIGN PATENT DOCUMENTS

WO WO-2023028969 A1 * 3/2023

OTHER PUBLICATIONS

3GPP TS 38.321, Medium Access Control (MAC) protocol specification, V16.5.0 (Sep. 2021) (Year: 2021).*

* cited by examiner

*Primary Examiner* — Ayaz R Sheikh
*Assistant Examiner* — David Zhijun Sun
(74) *Attorney, Agent, or Firm* — Procopio, Cory, Hargreaves & Savitch

(57) ABSTRACT

A first UE may receive, from a base station or a second UE, one or more first TCI states via RRC signaling. The first UE may receive, from the base station or the second UE, one or more MAC-CEs. Each of the one or more MAC-CEs may include at least one indication of one or more second TCI states. The one or more second TCI states may be a subset of the one or more first TCI states. The first UE may transmit to the second UE, or receive from the second UE, a sidelink message via a sidelink channel based on a third TCI state. The third TCI state may be from the one or more second TCI states.

28 Claims, 20 Drawing Sheets

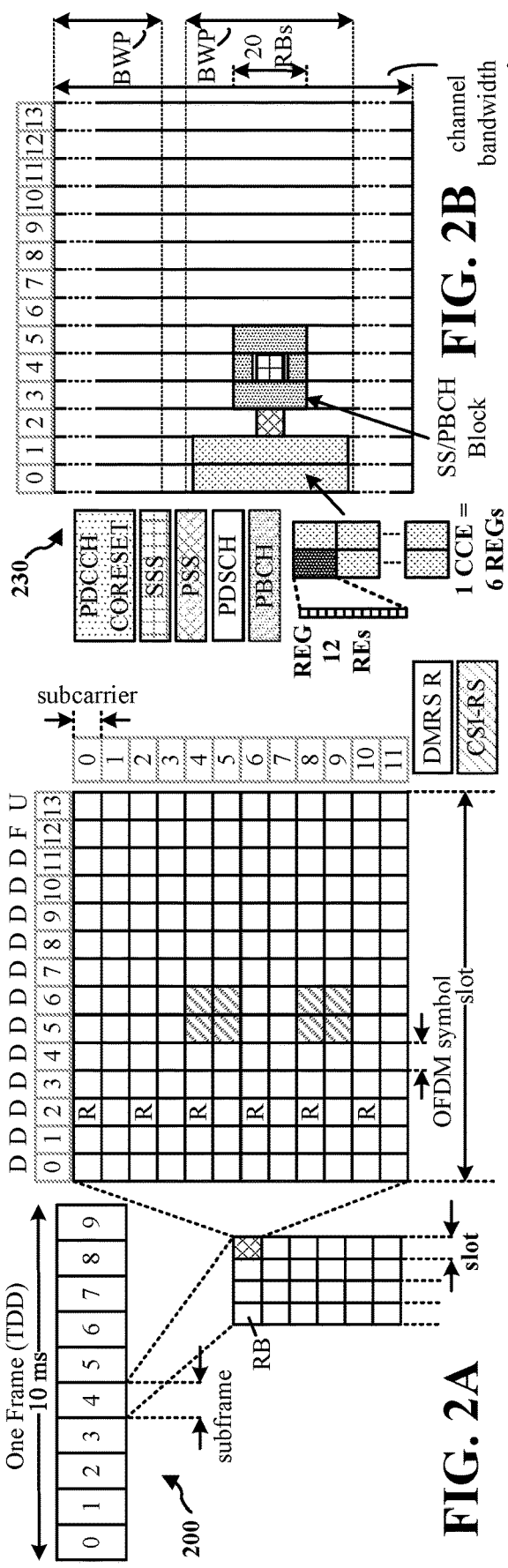
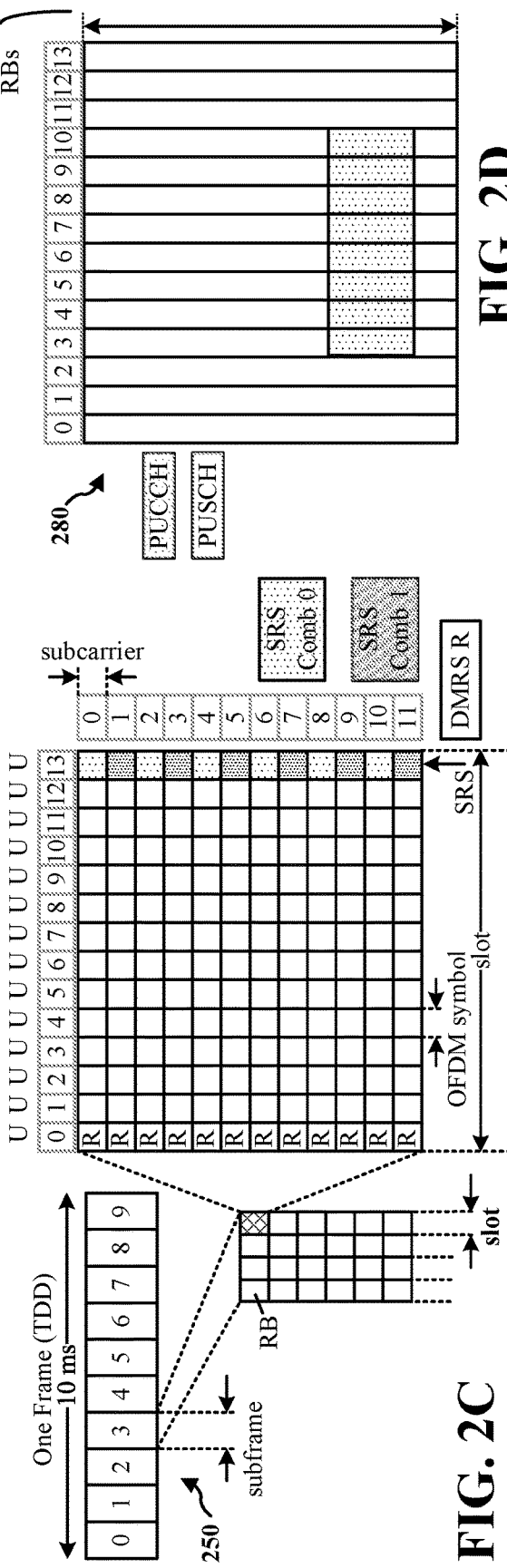
FIG. 2A  FIG. 2B  FIG. 2C  FIG. 2D

FIG. 5B

SL MAC-CE for Multiple TCI States Activation/Deactivation

| Tx/Rx | Serving Cell ID | | | | | | BWP ID | |
|---|---|---|---|---|---|---|---|---|
| $T_7$ | $T_6$ | $T_5$ | $T_4$ | $T_3$ | $T_2$ | $T_1$ | $T_0$ | |
| $T_{15}$ | $T_{14}$ | $T_{13}$ | $T_{12}$ | $T_{11}$ | $T_{10}$ | $T_9$ | $T_8$ | |

SL MAC-CE for Multiple TCI States Activation/Deactivation of Both Tx/Rx of PSSCH

| | Serving Cell ID | | | | | | BWP ID | |
|---|---|---|---|---|---|---|---|---|
| $T_7$ | $T_6$ | $T_5$ | $T_4$ | $T_3$ | $T_2$ | $T_1$ | $T_0$ | |
| $T_{15}$ | $T_{14}$ | $T_{13}$ | $T_{12}$ | $T_{11}$ | $T_{10}$ | $T_9$ | $T_8$ | |

SL MAC-CE for One TCI State indication

| Tx/Rx | Serving Cell ID | BWP ID |
|---|---|---|
| | TCI State ID | |

FIG. 5C

SL MAC-CE for TCI Indication of Both Tx/Rx of PSSCH

| | Serving Cell ID | BWP ID |
|---|---|---|
| | TCI State ID | |

FIG. 6A
FIG. 6B
FIG. 6C

| Serving Cell ID | | BWP ID | | | | |
|---|---|---|---|---|---|---|
| Tx/Rx | First Channel ID | Second Channel ID | | | | |
| | | TCI State ID$_{0,1}$ | TCI State ID$_{0,2}$ | ... | TCI State ID$_{N,1}$ | TCI State ID$_{N,2}$ |

MAC CE FORMAT FOR SIDELINK TCI

TECHNICAL FIELD

The present disclosure relates generally to communication systems, and more particularly, to indication of transmission configuration indicator (TCI) states for a sidelink.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first user equipment (UE). The apparatus may receive, from a base station or a second UE, one or more first transmission configuration indicator (TCI) states via radio resource control (RRC) signaling. Each of the one or more first TCI states may correspond to a quasi co-location (QCL) relationship between one or more source reference signals and a target reference signal associated with a target sidelink channel. The apparatus may receive, from the base station or the second UE, one or more medium access control (MAC)— control elements (CEs) (MAC-CEs). Each of the one or more MAC-CEs may include at least one indication of one or more second TCI states. The one or more second TCI states may be a subset of the one or more first TCI states. The apparatus may transmit to the second UE, or receive from the second UE, a sidelink message via a sidelink channel based on a third TCI state. The third TCI state may be from the one or more second TCI states.

In an aspect of the disclosure, a method, a computer-readable medium, and an apparatus are provided. The apparatus may be a second UE. The apparatus may transmit, to a first UE, one or more MAC-CEs. Each of the one or more MAC-CEs may include at least one indication of one or more second TCI states. The one or more second TCI states may be a subset of one or more first TCI states. Each of the one or more first TCI states may correspond to a QCL relationship between one or more source reference signals and a target reference signal associated with a target sidelink channel. The apparatus may transmit to the first UE, or receive from the first UE, a sidelink message via a sidelink channel based on a third TCI state. The third TCI state may be from the one or more second TCI states.

In an aspect of the disclosure, a method, a computer-readable medium, and an apparatus are provided. The apparatus may be base station. The apparatus may transmit, to a first UE, one or more first TCI states via RRC signaling. Each of the one or more first TCI states may correspond to a QCL relationship between one or more source reference signals and a target reference signal associated with a target sidelink channel. The apparatus may transmit, to the first UE, one or more MAC-CEs. Each of the one or more MAC-CEs may include at least one indication of one or more second TCI states. The one or more second TCI states may be a subset of one or more first TCI states. Transmission of a sidelink message between the first UE and a second UE may be based on a third TCI state. The third TCI state may be from the one or more second TCI states.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 5A-D are diagrams illustrating example sidelink MAC-CEs.

FIGS. 6A-C are diagrams illustrating example sidelink MAC-CEs.

FIG. 7 is a diagram illustrating a sidelink MAC-CE for indicating or activating TCI states for two target sidelink channels.

DETAILED DESCRIPTION

Figure 1:
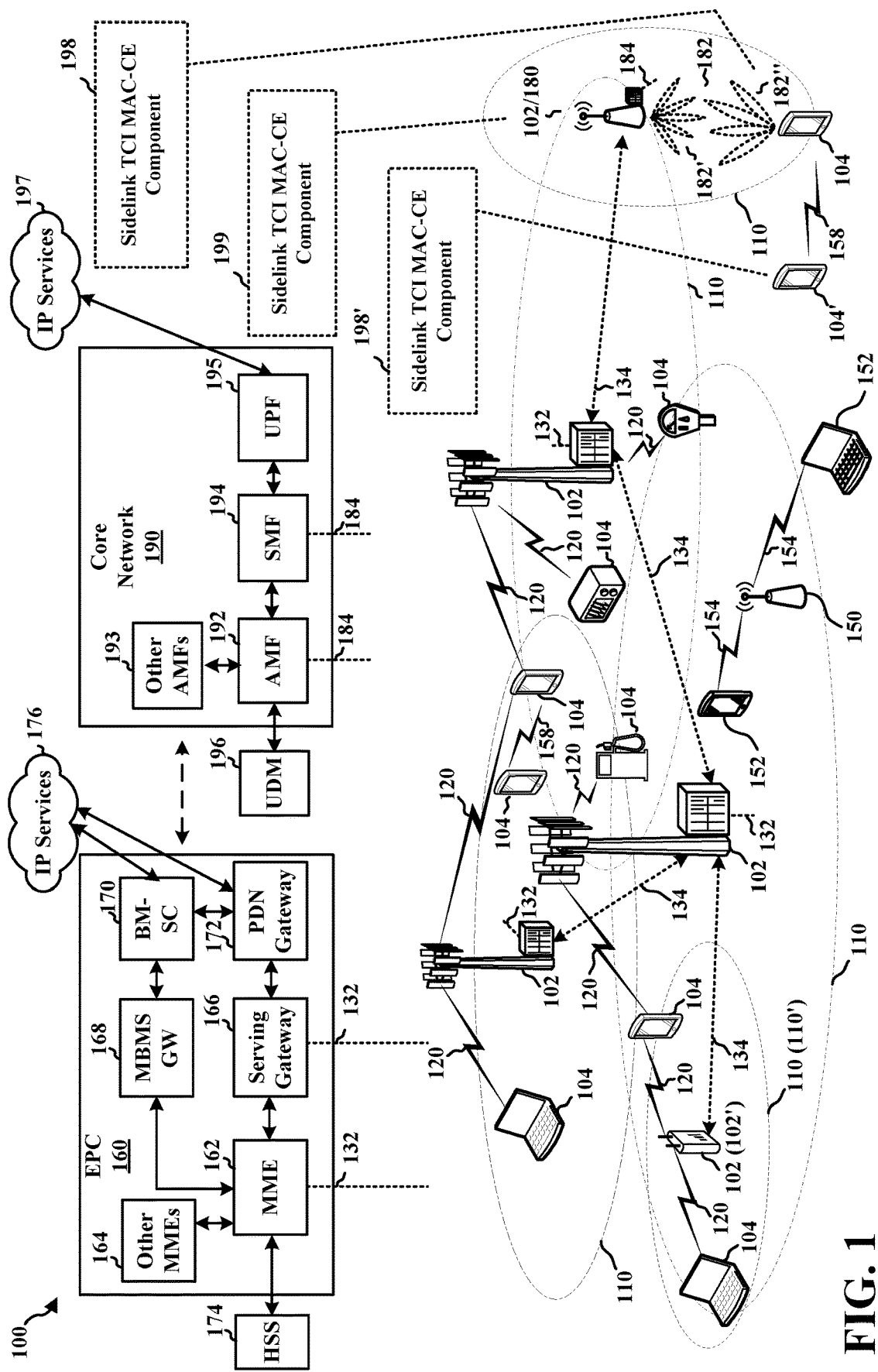
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the first UE 104 may include a sidelink TCI MAC-CE component 198 that may be configured to receive, from a base station or a second UE, one or more first TCI states via RRC signaling. Each of the one or more first TCI states may correspond to a QCL relationship between one or more source reference signals and a target reference signal associated with a target sidelink channel. The sidelink TCI MAC-CE component 198 may be configured to receive, from the base station or the second UE, one or more MAC-CEs. Each of the one or more MAC-CEs may include at least one indication of one or more second TCI states. The one or more second TCI states may be a subset of the one or more first TCI states. The sidelink TCI MAC-CE component 198 may be configured to transmit to the second UE, or receive from the second UE, a sidelink message via a sidelink channel based on a third TCI state. The third TCI state may be from the one or more second TCI states.

In certain aspects, the second UE 104' may include a sidelink TCI MAC-CE component 198' that may be configured to transmit, to a first UE, one or more MAC-CEs. Each of the one or more MAC-CEs may include at least one indication of one or more second TCI states. The one or more second TCI states may be a subset of one or more first TCI states. Each of the one or more first TCI states may correspond to a QCL relationship between one or more source reference signals and a target reference signal associated with a target sidelink channel. The sidelink TCI MAC-CE component 198' may be configured to transmit to the first UE, or receive from the first UE, a sidelink message via a sidelink channel based on a third TCI state. The third TCI state may be from the one or more second TCI states.

In certain aspects, the base station 180 may include a sidelink TCI MAC-CE component 199 that may be configured to transmit, to a first UE, one or more first TCI states via RRC signaling. Each of the one or more first TCI states may correspond to a QCL relationship between one or more source reference signals and a target reference signal associated with a target sidelink channel. The sidelink TCI MAC-CE component 199 may be configured to transmit, to the first UE, one or more MAC-CEs. Each of the one or more MAC-CEs may include at least one indication of one or more second TCI states. The one or more second TCI states may be a subset of one or more first TCI states. Transmission of a sidelink message between the first UE and a second UE may be based on a third TCI state. The third TCI state may be from the one or more second TCI states. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
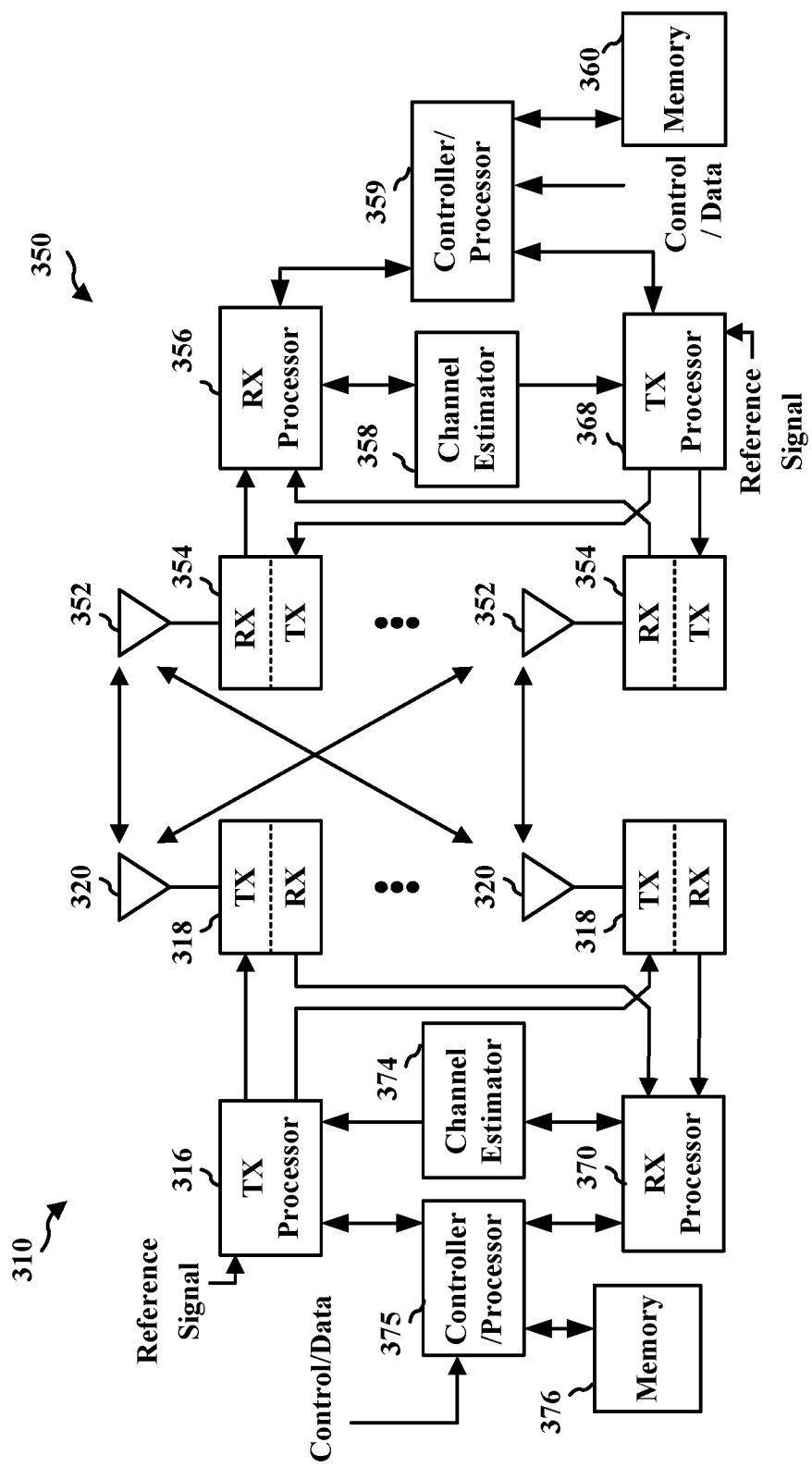
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 and 198' of FIG. 1.

At least one of the TX processor 316, the RX processor 370, and the controller/processor 375 may be configured to perform aspects in connection with 199 of FIG. 1.

Figure 4:
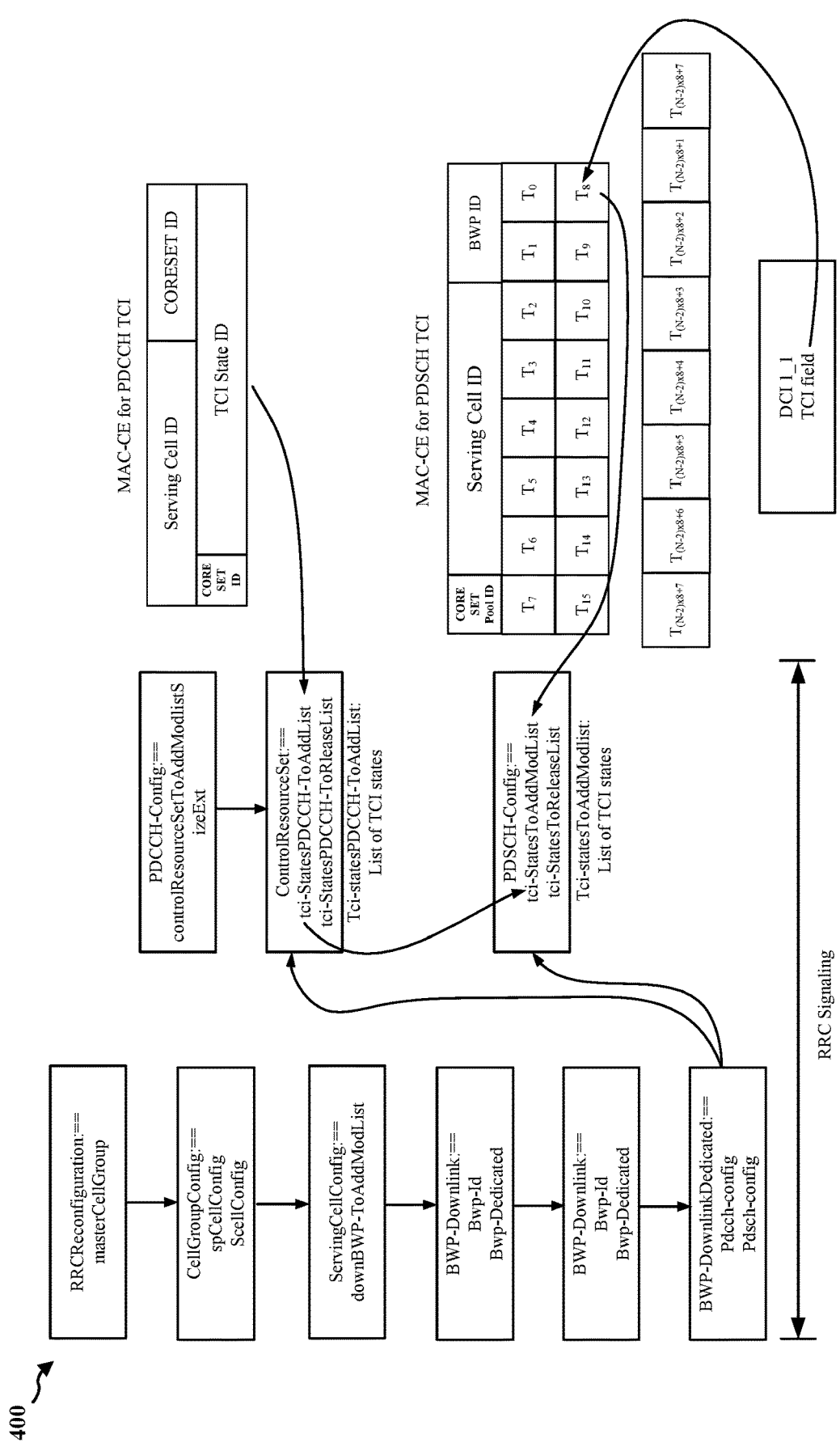
FIG. 4 is a diagram illustrating configuration of transmission configuration indicator (TCI) states over the Uu interface.

FIG. 4 is a diagram 400 illustrating configuration of transmission configuration indicator (TCI) states over the Uu interface. A base station may configure a UE with a list of TCI state via RRC signaling (in particular, via an RRCReconfiguration message). Each TCI state may include parameters for configuring a QCL relationship between one or two downlink reference signals and the DM-RS ports of a PDSCH, the DM-RS port of a PDCCH, or the CSI-RS ports of a CSI-RS resource. A maximum of two QCL types may be configured per TCI state. The QCL relationship may be configured with the RRCReconfiguration parameter "qcl-Type1" for the first downlink reference signal, and the RRCReconfiguration parameter "qcl-Type2" for the second downlink reference signal.

The base station may indicate the QCL information for a PDCCH to the UE via a UE-specific PDCCH MAC-CE. In particular, the UE-specific PDCCH MAC-CE may include an identifier (ID) of the TCI state, as well as an ID of the serving cell and a CORESET ID.

For the PDSCH, the base station may activate M (e.g., 8) TCI states via a UE-specific PDSCH MAC-CE. In particular, the UE-specific PDSCH MAC-CE may include a TCI state bitmap. Each of the TCI states configured via RRC signaling may be associated with one bit position in the TCI state bitmap. If a bit in a specific location in the bitmap is set to be '1', the TCI state mapped to the position of the bit may be activated. If a bit is set to be '0', the TCI state mapped to the position of the bit may be deactivated. The positions of '1' bits may be assigned, in increasing order, to a list referred to as the codepoint. Thus, each of the activated TCI states may be associated with a codepoint index. The base station may indicate one of the activated TCI states to the UE using a TCI field in a DCI message. In particular, the TCI field may include the codepoint index for the TCI state indicated by the base station.

In one or more aspects, TCI states may be used for sidelink (e.g., PC5) communications between UEs (e.g., between a first UE and a second UE). A base station or a second UE may configure a first UE with a list of TCI states (e.g., via RRC signaling). Using a MAC-CE, the base station or the second UE may indicate one TCI state from the list of TCI states, or may active or deactivate a number of TCI states from the list of TCI states. If a number of TCI states are activated, the base station or the second UE may further indicate one of the activated TCI states via a DCI message or a sidelink control information (SCI) message, respectively. In particular, the activated TCI states may correspond to codepoint indexes, and the DCI message or the SCI message may include a TCI field that includes the codepoint index for the indicated TCI state. Thereafter, the first UE may communicate with the second UE over a sidelink based on the indicated TCI state.

In one configuration, a MAC-CE may activate a subset of configured joint sidelink TCI states. In one configuration, a MAC-CE may be transmitted from a base station to a sidelink UE. A MAC-CE transmitted from a base station to a sidelink UE may be referred to as a Uu MAC-CE. In one configuration, a MAC-CE may be transmitted from one sidelink UE to another sidelink UE. A MAC-CE transmitted from one sidelink UE to another sidelink UE may be referred to as a sidelink MAC-CE.

In one or more configurations, a MAC-CE activating a subset of TCI states for a sidelink may include one or more of a serving cell ID, a BWP ID, a resource pool ID, one or more indications of one or more target sidelink channels (e.g., one or more of a PSCCH, a PSSCH, or a physical sidelink feedback channel (PSFCH)), one or more indications of the communication direction (e.g., Tx/Rx/both) in relation to the target sidelink channels and the TCI states from the perspective of the UE receiving the MAC-CE, or one or more indications of one or more QCL source reference signals.

In one configuration, separate MAC-CEs may be used for the different sidelink channels (e.g., the PSCCH, the PSSCH, or the PSFCH). In other words, each MAC-CE may be dedicated to one of the sidelink channels. Because the sidelink is symmetric, a communication direction in relation to a target sidelink channel may be indicated for a TCI state.

In one configuration, different MAC-CEs may be used for the different communication directions in relation to the respective target channel. In one configuration, a MAC-CE for a sidelink channel may include a 1-bit field to indicate the communication direction for the TCI states. For example, if the bit is set to be '1', the MAC-CE may be for the Tx direction; if the bit is set to be '0', the MAC-CE may be for the Rx direction. Of course, an opposite definition of the meaning of the bit may also be used.

In one configuration, one unified MAC-CE may be used to indicate TCI states for two (or more) target sidelink channels. The MAC-CE may indicate TCI states for Tx and Rx beams for the same channel, as well as for different channels.

FIGS. 5A-D are diagrams illustrating example sidelink MAC-CEs 500A-D. FIG. 5A illustrates a sidelink MAC-CE 500A for indicating one TCI state. The MAC-CE 500A may include a 1-bit field to indicate the communication direction (Tx/Rx) for the indicated TCI state in relation to the target sidelink channel with which the MAC-CE 500A is associated. If different MAC-CEs are used for the two different communication directions, the communication direction bit may be omitted. The MAC-CE 500A may further include a serving cell ID, a BWP ID, and an ID of the indicated TCI state.

FIG. 5B illustrates a sidelink MAC-CE 500B for activating/deactivating multiple TCI states. The MAC-CE 500B may include a 1-bit field to indicate the communication direction (Tx/Rx) for the TCI states in relation to the target sidelink channel with which the MAC-CE 500B is associated. If different MAC-CEs are used for the two different communication directions, the communication direction bit may be omitted. To indicate the activation or deactivation of the TCI states, the MAC-CE 500B may include a TCI state bitmap, where each bit position in the bitmap may correspond to one of the RRC configured TCI states. The TCI state bitmap in the MAC-CE 500B may be similar to the TCI state bitmap in the UE-specific PDSCH MAC-CE, which has been described above. The MAC-CE 500B may further include a serving cell ID and a BWP ID.

FIG. 5C illustrates a sidelink MAC-CE 500C for indicating one TCI state for both Tx and Rx in relation to the target sidelink channel (e.g., the PSSCH) associated with the MAC-CE 500C. Because the indicated TCI state is for both Tx and Rx, the MAC-CE 500C may not include a communication direction field. The MAC-CE 500C may be similar to the MAC-CE 500A, except that the MAC-CE 500C may not include a communication direction field.

FIG. 5D illustrates a sidelink MAC-CE 500D for activating/deactivating multiple TCI states for both Tx and Rx in relation to the target sidelink channel (e.g., the PSSCH) associated with the MAC-CE 500C. Because the activated or deactivated TCI states are for both Tx and Rx, the MAC-CE 500D may not include a communication direction field. The MAC-CE 500D may be similar to the MAC-CE 500B, except that the MAC-CE 500D may not include a communication direction field.

FIGS. 6A-C are diagrams illustrating example sidelink MAC-CEs 600A-C. FIG. 6A illustrates a sidelink MAC-CE 600A for indicating a first TCI state for Tx in relation to the target sidelink channel associated with the MAC-CE 600A and a second TCI state for Rx in relation to the target sidelink channel. The MAC-CE 600A may include an ID of the first TCI state and an ID of the second TCI state. An individual 1-bit communication direction field may be associated with each of the TCI state IDs, and may be used to indicate the communication direction (e.g., Tx or Rx). Therefore, the MAC-CE 600A may be used to indicate different TCI states for Tx and Rx.

FIG. 6B illustrates a sidelink MAC-CE 600B for activating/deactivating multiple first TCI states for Tx in relation to the target sidelink channel associated with the MAC-CE 600B and multiple second TCI states for Rx in relation to the target sidelink channel. The MAC-CE 600B may include a TCI state bitmap, in which each octet (i.e., every 8 consecutive bits in the bitmap) may include an individual 1-bit communication direction field to indicate the communication direction (e.g., Tx or Rx). Therefore, the MAC-CE 600B may be used to indicate different TCI states for Tx and Rx. Accordingly, based on the MAC-CE 600B, Tx and Rx may be associated with separate codepoints. As a result, to indicate one activated TCI state, the TCI field in the DCI message or the SCI message may include an additional bit to indicate the communication direction (Tx or Rx), in addition to the codepoint index.

In one configuration, alternate octets in the TCI bitmap may be associated with one or the other of the communication directions. For example, it may be specified that the even octets (e.g., [T0 . . . T7], etc.) may be for Tx, and odd octets (e.g., [T8 . . . T15], etc.) may be for Rx (or even octets for Rx, odd octets for Tx). Accordingly, communication direction fields may be omitted in the MAC-CE.

FIG. 6C illustrates a sidelink MAC-CE 600C for activating/deactivating multiple first TCI states for Tx in relation to the target sidelink channel associated with the MAC-CE 600B and multiple second TCI states for Rx in relation to the target sidelink channel, where alternate bits in the TCI state bitmap may be for one or the other of the communication directions. Similar to the scenario with the MAC-CE 600B, to indicate one activated TCI state, the TCI field in the DCI message or the SCI message may include an additional bit to indicate the communication direction (Tx or Rx), in addition to the codepoint index.

FIG. 7 is a diagram illustrating a sidelink MAC-CE 700 for indicating or activating TCI states for two target sidelink channels. For each target sidelink channel, the MAC-CE 700 may indicate or activate/deactivate one or more TCI states for either Tx or Rx. For example, the MAC-CE 700 may indicate or activate/deactivate TCI states for the Rx beam of the PSSCH and the Tx beam for the PSFCH. Accordingly, the MAC-CE 700 may include a first target sidelink channel ID for the first target sidelink channel and a second target sidelink channel ID for the second target sidelink channel. Each of the target sidelink channel IDs may be associated with a 1-bit communication direction field to indicate Tx or Rx. In one configuration, each of the target sidelink channel IDs may be 3-bit long. 8 different channels may be indicated with the 3-bit target sidelink channel ID. "TCI State $Id_{x,1}$" may be the TCI state ID with the codepoint index x for the first target sidelink channel, and "TCI State $Id_{x,2}$" may be the TCI state ID with the codepoint index x for the second target sidelink channel. Therefore, one codepoint index included in a DCI message or an SCI message may indicate two TCI states, one for each target sidelink channel. For example, if the DCI message or the SCI message includes a codepoint index of 0 in the TCI field, the two TCI states associated with the IDs "TCI State $Id_{0,1}$" and "TCI State $Id_{0,2}$" may be indicated (for the first target sidelink channel and the second target sidelink channel, respectively).

To indicate an activated TCI state, a DCI message or an SCI message may also include an indication of the channel or the type of the MAC-CE to which the TCI field refers. For example, the DCI message or the SCI message may indicate that the MAC-CE to which the TCI field refers is a PSSCH (Tx/Rx) MAC-CE, a PSFCH (Tx/Rx) MAC-CE, a MAC-CE for the PSSCH and the PSFCH, or a MAC-CE for the PSCCH and the PSSCH, etc. The channel or the type of the MAC-CE may cost additional bits to indicate. The indication of the channel or the type of the MAC-CE may increase the size of the DCI message or the SCI message.

Figure 8:
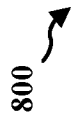
FIG. 8 is a diagram illustrating an example flexible sidelink MAC-CE.

FIG. 8 is a diagram illustrating an example flexible sidelink MAC-CE 800. The MAC-CE 800 may include a serving cell ID and a BWP ID. The MAC-CE 800 may include multiple parts, where each part may include a pattern field, a length field, and the payload field for the target sidelink channel IDs and TCI state IDs. The pattern field may be used to indicate the number of target sidelink channels (e.g., 1 channel, 2 channels, etc.) that are associated with the corresponding payload field. The length field may be used to indicate the length of the part (e.g., in terms of the number of octets). The payload field may be used to indicate or activate/deactivate TCI states for one or more target sidelink channels. MAC-CE formats for TCI state indication or activation/deactivation described heretofore, with appropriate modifications, may be used in the payload field. For example, the serving cell ID or the BWP ID may not be included in the payload field. In a DCI message or an SCI message that indicates a TCI state, a codepoint i may point to the i-th TCI state ID across all parts in the MAC-CE 800.

Figure 9:
FIG. 9 is a diagram illustrating a Uu MAC-CE for activating/deactivating multiple TCI states for a target sidelink channel.

FIG. 9 is a diagram illustrating a Uu MAC-CE 900 for activating/deactivating multiple TCI states for a target sidelink channel. In general, all the configurations for the sidelink MAC-CE described heretofore may be used for the Uu MAC-CE. Because a Uu MAC-CE is transmitted from a base station, the Uu MAC-CE may include an ID of the sidelink to which the Uu MAC-CE relates. In one configuration, the ID of the sidelink may include an ID of the other UE (e.g., the second UE) associated with the sidelink. The sidelink may be identified based on the identities of the UE receiving the Uu MAC-CE and the other UE. In one configuration, the ID of the sidelink may be an ID that uniquely identifies the sidelink (e.g., a unique link ID). Therefore, the MAC-CE 900 may include an ID of the other UE associated with the sidelink, in addition to the communication direction field, the serving cell ID, the BWP ID, and the TCI state bitmap.

Figures 10A, 10B:
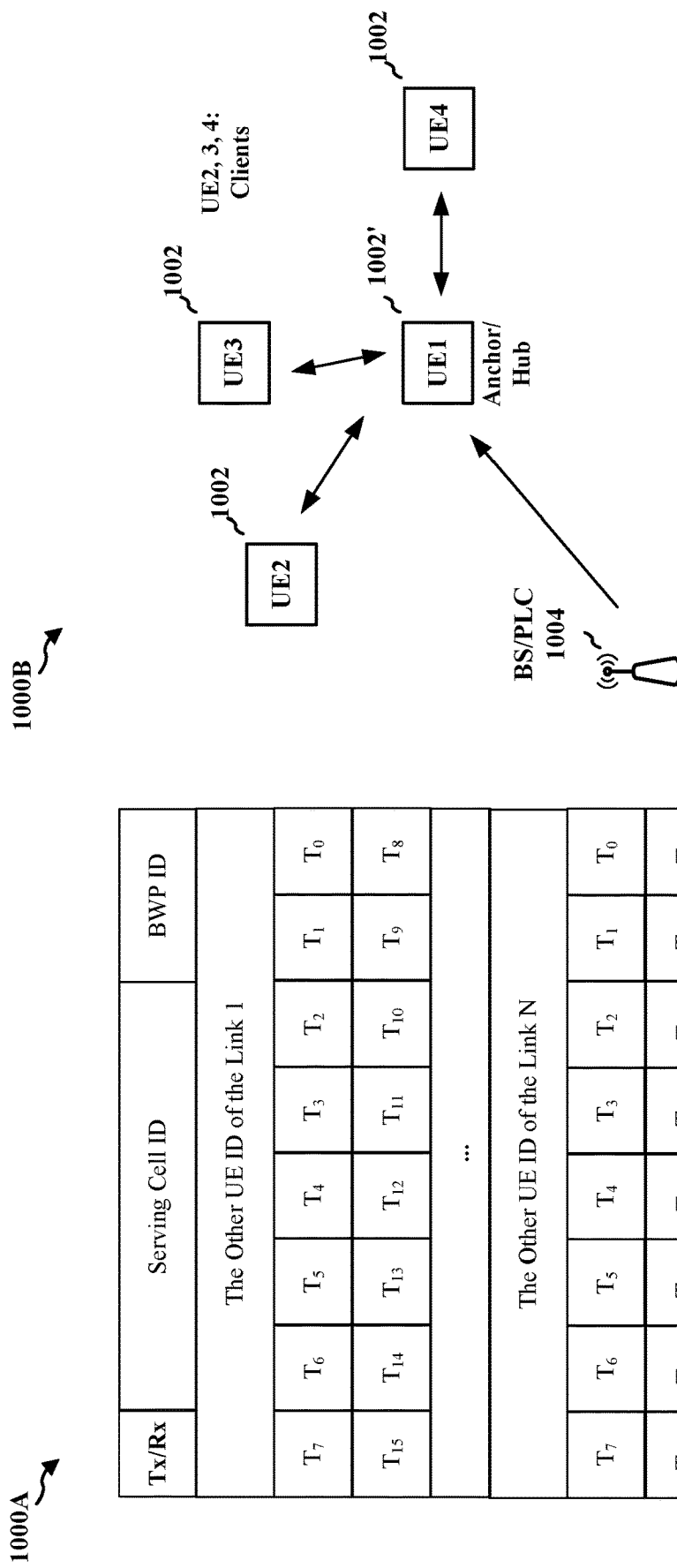
FIG. 10A is a diagram illustrating a multi-sidelink MAC-CE for activating/deactivating multiple TCI states for each of a number of sidelinks.
FIG. 10B is a diagram illustrating an environment in which the multi-sidelink MAC-CE may be used.

FIG. 10A is a diagram illustrating a multi-sidelink MAC-CE 1000A for activating/deactivating multiple TCI states for each of a number of sidelinks. FIG. 10B is a diagram illustrating an environment 1000B in which the multi-sidelink MAC-CE 1000A may be used. As shown in FIG. 10B, a base station 1004 (or a wireless programmable logic controller (PLC)) may transmit a Uu (or sidelink) multi-sidelink MAC-CE 1000A to an anchor/hub UE 1002' to activate TCI states for all the sidelinks of the anchor/hub UE 1002' (i.e., the sidelinks between the anchor/hub UE 1002' and the other UEs 1002). The multi-sidelink MAC-CE 1000A may include multiple parts, each of which may correspond to one sidelink. Each part may include an ID of the sidelink to which the part relates and the TCI state indication or activation/deactivation information (e.g., a TCI state bitmap). The ID of a sidelink may be an ID of the other UE associated with the sidelink, or a unique link ID of the sidelink. The multi-sidelink MAC-CE 1000A may further include a communication direction field, a serving cell ID, and a BWP ID.

Figure 11:
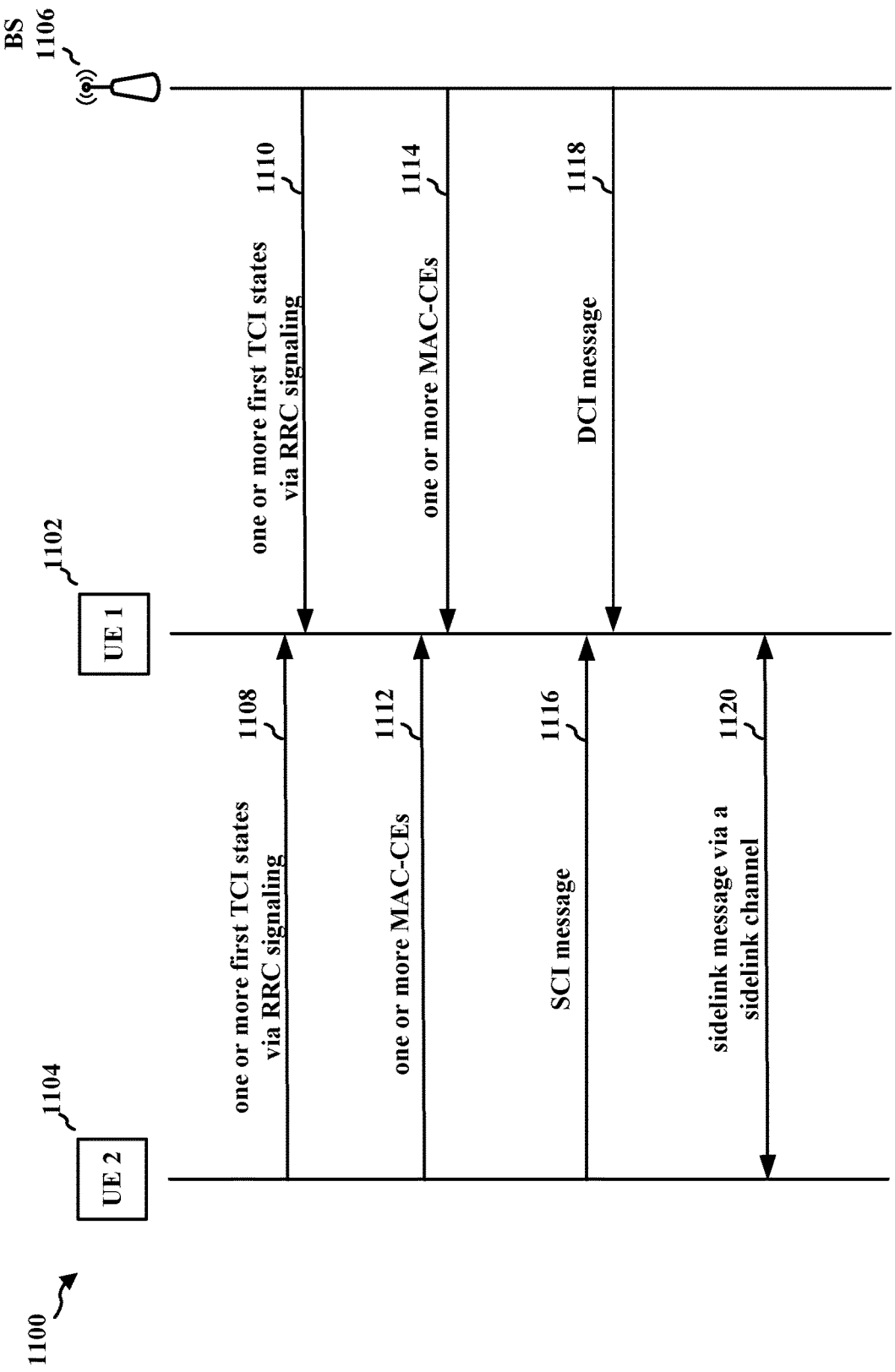
FIG. 11 is a diagram of a communication flow of a method of wireless communication.

FIG. 11 is a diagram of a communication flow 1100 of a method of wireless communication. At 1108, the second UE 1104 may transmit, to the first UE 1102, and the first UE 1102 may receive, from the second UE 1104, one or more first TCI states via RRC signaling. Alternatively, at 1110, the base station 1106 may transmit, to a first UE 1102, and the first UE 1102 may receive, from the base station 1106, one or more first TCI states via RRC signaling. Each of the one or more first TCI states may correspond to a QCL relationship between one or more source reference signals and a target reference signal associated with a target sidelink channel.

At 1112, the second UE 1104 may transmit, to a first UE 1102, and the first UE 1102 may receive, from the second UE 1104, one or more MAC-CEs. Alternatively, at 1114, the base station 1106 may transmit, to the first UE 1102, and the first UE 1102 may receive, from the base station 1106, one or more MAC-CEs. Each of the one or more MAC-CEs may include at least one indication of one or more second TCI states. The one or more second TCI states may be a subset of the one or more first TCI states.

In one configuration, each of the one or more MAC-CEs may include at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals.

In one configuration, the sidelink channel may correspond to one of a PSCCH, a PSSCH, or a PSFCH.

In one configuration, at least one MAC-CE of the one or more MAC-CEs may be associated with a single communication direction in relation to one or more target sidelink channels associated with the at least one MAC-CE. The single communication direction may be transmission or reception.

In one configuration, at least one MAC-CE of the one or more MAC-CEs may be associated with both communication directions in relation to one or more target sidelink channels associated with the at least one MAC-CE. The both communication directions may be transmission and reception.

In one configuration, the one or more second TCI states associated with the at least one MAC-CE may be associated with the both communication directions.

In one configuration, the at least one MAC-CE may include, for each indication of the at least one indication of the one or more second TCI states, an indication of a communication direction in relation to a respective target sidelink channel.

In one configuration, the at least one indication of the one or more second TCI states included in the at least one MAC-CE may be alternately associated with one or the other of the both communication directions.

In one configuration, at least one MAC-CE of the one or more MAC-CEs may be associated with a single target sidelink channel.

In one configuration, at least one MAC-CE of the one or more MAC-CEs may be associated with two or more target sidelink channels.

In one configuration, the one MAC-CE may include, for each of the two or more target sidelink channels, at least one indication of at least one fourth TCI state. The one or more second TCI states may include the at least one fourth TCI state.

In one configuration, at least one MAC-CE of the one or more MAC-CEs may be received from the base station, and may be associated with one or more IDs of one or more sidelinks.

In one configuration, the one or more IDs of the one or more sidelinks may correspond to one or more IDs of one or more UEs including the second UE and excluding the first UE.

At 1116, the second UE 1104 may transmit, to the first UE 1102, and the first UE 1102 may receive, from the second UE 1104, an SCI message. At 1118, the base station 1106 may transmit, to the first UE 1102, and the first UE 1102 may receive, from the base station 1106, a DCI message.

In one configuration, the one or more second TCI states associated with at least one MAC-CE of the one or more MAC-CEs may include a single second TCI state. The single second TCI state may be the third TCI state.

In one configuration, the one or more second TCI states associated with at least one MAC-CE of the one or more MAC-CEs may include a plurality of second TCI states. The plurality of second TCI states may include the third TCI state.

In one configuration, the DCI message or the SCI message may be associated with the sidelink message. The DCI message or the SCI message may include an indication of the third TCI state. The indication of the third TCI state may be associated with the at least one MAC-CE.

In one configuration, the DCI message or the SCI message may include a communication direction associated with the indication of the third TCI state.

At 1120, the first UE 1102 may transmit to the second UE 1104, or receive from the second UE 1104, a sidelink message via a sidelink channel based on a third TCI state.

Figure 12:
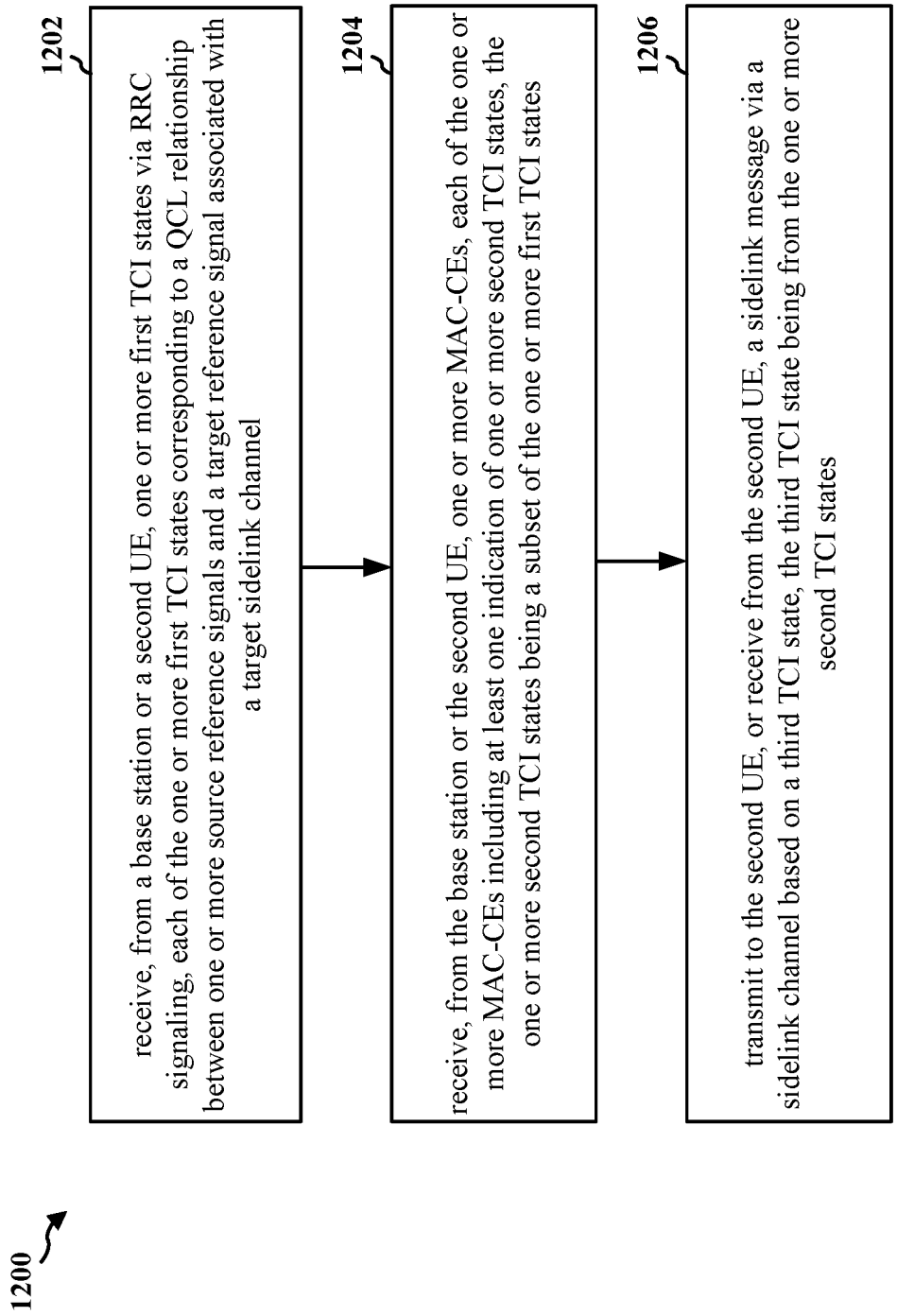
FIG. 12 is a flowchart of a method of wireless communication.

FIG. 12 is a flowchart 1200 of a method of wireless communication. The method may be performed by a first UE (e.g., the UE 104/350/1102; the apparatus 1802). At 1202, the first UE may receive, from a base station or a second UE, one or more first TCI states via RRC signaling. Each of the one or more first TCI states may correspond to a QCL relationship between one or more source reference signals and a target reference signal associated with a target sidelink channel. For example, 1202 may be performed by the sidelink TCI MAC-CE component 1840 in FIG. 18. Referring to FIG. 11, at 1110 or 1108, the first UE 1102 may receive, from a base station 1106 or a second UE 1104, one or more first TCI states via RRC signaling.

At 1204, the first UE may receive, from the base station or the second UE, one or more MAC-CEs. Each of the one or more MAC-CEs may include at least one indication of one or more second TCI states. The one or more second TCI states may be a subset of the one or more first TCI states. For example, 1204 may be performed by the sidelink TCI MAC-CE component 1840 in FIG. 18. Referring to FIG. 11, at 1114 or 1112, the first UE 1102 may receive, from the base station 1106 or the second UE 1104, one or more MAC-CEs.

At 1206, the first UE may transmit to the second UE, or receive from the second UE, a sidelink message via a sidelink channel based on a third TCI state. The third TCI state may be from the one or more second TCI states. For example, 1206 may be performed by the sidelink TCI MAC-CE component 1840 in FIG. 18. Referring to FIG. 11, at 1120, the first UE 1102 may transmit to the second UE 1104, or receive from the second UE 1104, a sidelink message via a sidelink channel based on a third TCI state.

Figure 13:
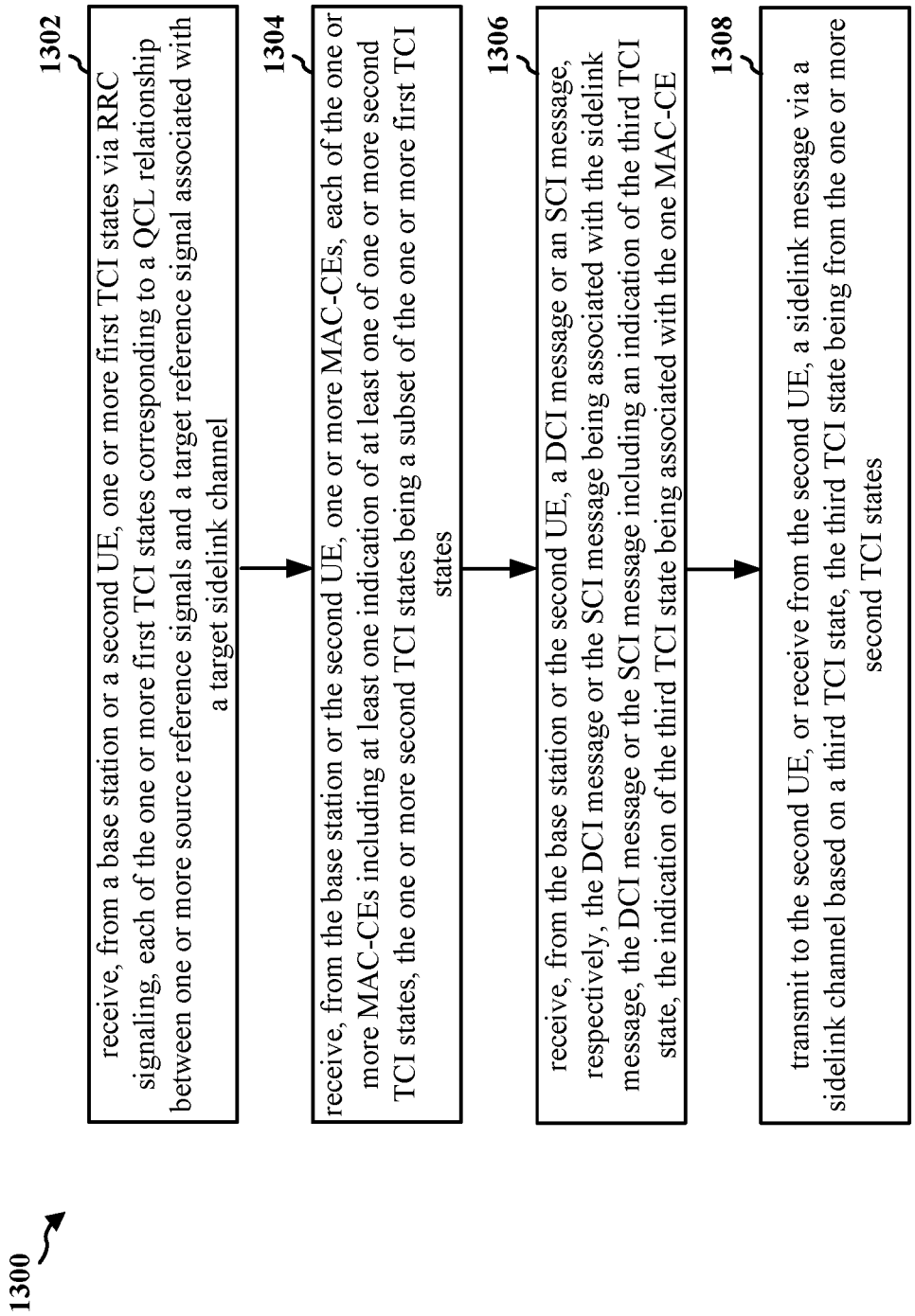
FIG. 13 is a flowchart of a method of wireless communication.

FIG. 13 is a flowchart 1300 of a method of wireless communication. The method may be performed by a first UE (e.g., the UE 104/350/1102; the apparatus 1802). At 1302, the first UE may receive, from a base station or a second UE, one or more first TCI states via RRC signaling. Each of the one or more first TCI states may correspond to a QCL relationship between one or more source reference signals and a target reference signal associated with a target sidelink channel. For example, 1302 may be performed by the sidelink TCI MAC-CE component 1840 in FIG. 18. Referring to FIG. 11, at 1110 or 1108, the first UE 1102 may receive, from a base station 1106 or a second UE 1104, one or more first TCI states via RRC signaling.

At 1304, the first UE may receive, from the base station or the second UE, one or more MAC-CEs. Each of the one or more MAC-CEs may include at least one indication of one or more second TCI states. The one or more second TCI states may be a subset of the one or more first TCI states. For example, 1304 may be performed by the sidelink TCI MAC-CE component 1840 in FIG. 18. Referring to FIG. 11, at 1114 or 1112, the first UE 1102 may receive, from the base station 1106 or the second UE 1104, one or more MAC-CEs.

At 1308, the first UE may transmit to the second UE, or receive from the second UE, a sidelink message via a sidelink channel based on a third TCI state. The third TCI state may be from the one or more second TCI states. For example, 1308 may be performed by the sidelink TCI MAC-CE component 1840 in FIG. 18. Referring to FIG. 11, at 1120, the first UE 1102 may transmit to the second UE 1104, or receive from the second UE 1104, a sidelink message via a sidelink channel based on a third TCI state.

In one configuration, each of the one or more MAC-CEs may include at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals.

In one configuration, the sidelink channel may correspond to one of a PSCCH, a PSSCH, or a PSFCH.

In one configuration, the one or more second TCI states associated with at least one MAC-CE of the one or more MAC-CEs may include a single second TCI state. The single second TCI state may be the third TCI state.

In one configuration, the one or more second TCI states associated with at least one MAC-CE of the one or more MAC-CEs may include a plurality of second TCI states. The plurality of second TCI states may include the third TCI state.

In one configuration, at 1306, the first UE may receive, from the base station or the second UE, a DCI message or an SCI message, respectively. The DCI message or the SCI message may be associated with the sidelink message. The DCI message or the SCI message may include an indication of the third TCI state. The indication of the third TCI state may be associated with the at least one MAC-CE. For example, 1306 may be performed by the sidelink TCI MAC-CE component 1840 in FIG. 18. Referring to FIG. 11, at 1118 or 1116, the first UE 1102 may receive, from the base station 1106 or the second UE 1104, a DCI message or an SCI message, respectively.

In one configuration, the DCI message or the SCI message may include a communication direction associated with the indication of the third TCI state.

In one configuration, at least one MAC-CE of the one or more MAC-CEs may be associated with a single communication direction in relation to one or more target sidelink channels associated with the at least one MAC-CE. The single communication direction may be transmission or reception.

In one configuration, at least one MAC-CE of the one or more MAC-CEs may be associated with both communication directions in relation to one or more target sidelink channels associated with the at least one MAC-CE. The both communication directions may be transmission and reception.

In one configuration, the one or more second TCI states associated with the at least one MAC-CE may be associated with the both communication directions.

In one configuration, the at least one MAC-CE may include, for each indication of the at least one indication of the one or more second TCI states, an indication of a communication direction in relation to a respective target sidelink channel.

In one configuration, the at least one indication of the one or more second TCI states included in the at least one MAC-CE may be alternately associated with one or the other of the both communication directions.

In one configuration, at least one MAC-CE of the one or more MAC-CEs may be associated with a single target sidelink channel.

In one configuration, at least one MAC-CE of the one or more MAC-CEs may be associated with two or more target sidelink channels.

In one configuration, the one MAC-CE may include, for each of the two or more target sidelink channels, at least one indication of at least one fourth TCI state. The one or more second TCI states may include the at least one fourth TCI state.

In one configuration, at least one MAC-CE of the one or more MAC-CEs may be received from the base station, and may be associated with one or more IDs of one or more sidelinks.

In one configuration, the one or more IDs of the one or more sidelinks may correspond to one or more IDs of one or more UEs including the second UE and excluding the first UE.

Figure 14:
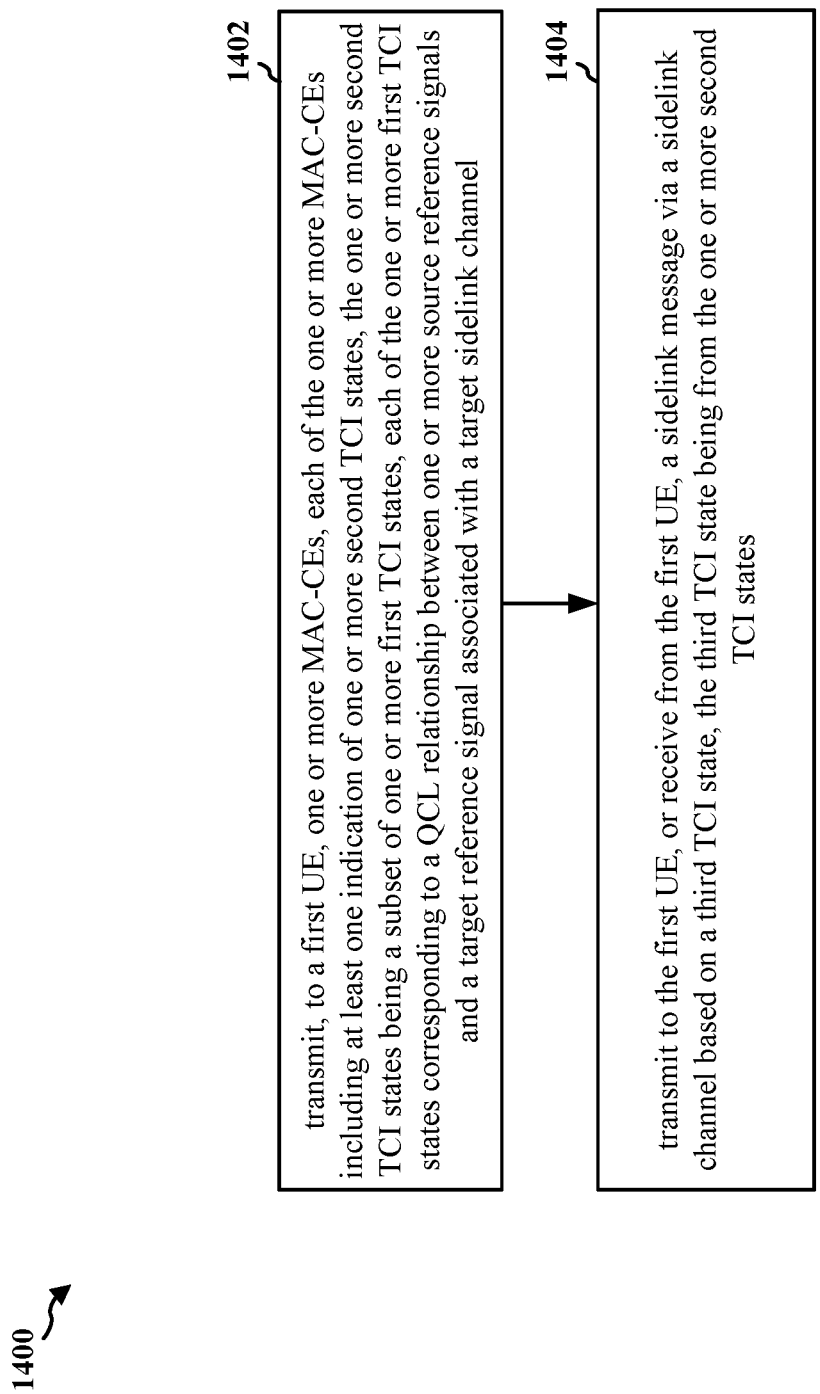
FIG. 14 is a flowchart of a method of wireless communication.

FIG. 14 is a flowchart 1400 of a method of wireless communication. The method may be performed by a second UE (e.g., the UE 104'/350/1104; the apparatus 1902). At 1402, the second UE may transmit, to a first UE, one or more MAC-CEs. Each of the one or more MAC-CEs may include at least one indication of one or more second TCI states. The one or more second TCI states may be a subset of one or more first TCI states. Each of the one or more first TCI states may correspond to a QCL relationship between one or more source reference signals and a target reference signal associated with a target sidelink channel. For example, 1402 may be performed by the sidelink TCI MAC-CE component 1940 in FIG. 19. Referring to FIG. 11, at 1112, the second UE 1104 may transmit, to a first UE 1102, one or more MAC-CEs.

At 1404, the second UE may transmit to the first UE, or receive from the first UE, a sidelink message via a sidelink channel based on a third TCI state. The third TCI state may be from the one or more second TCI states. For example, 1404 may be performed by the sidelink TCI MAC-CE component 1940 in FIG. 19. Referring to FIG. 11, at 1120, the second UE may transmit to the first UE, or receive from the first UE, a sidelink message via a sidelink channel based on a third TCI state.

Figure 15:
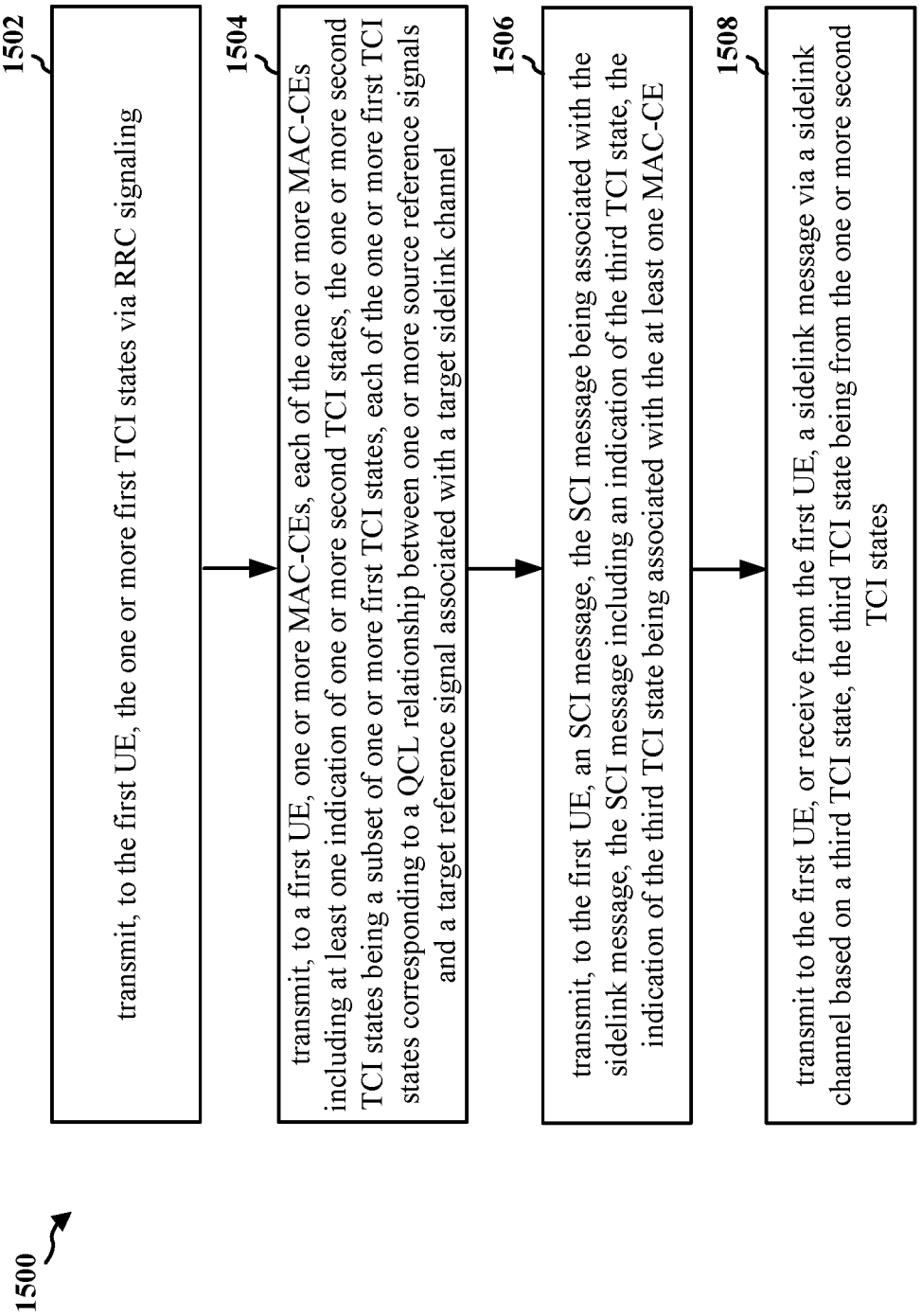
FIG. 15 is a flowchart of a method of wireless communication.

FIG. 15 is a flowchart 1500 of a method of wireless communication. The method may be performed by a second UE (e.g., the UE 104'/350/1104; the apparatus 1902). At 1504, the second UE may transmit, to a first UE, one or more MAC-CEs. Each of the one or more MAC-CEs may include at least one indication of one or more second TCI states. The one or more second TCI states may be a subset of one or more first TCI states. Each of the one or more first TCI states may correspond to a QCL relationship between one or more source reference signals and a target reference signal associated with a target sidelink channel. For example, 1504 may be performed by the sidelink TCI MAC-CE component 1940 in FIG. 19. Referring to FIG. 11, at 1112, the second UE 1104 may transmit, to a first UE 1102, one or more MAC-CEs.

At 1508, the second UE may transmit to the first UE, or receive from the first UE, a sidelink message via a sidelink channel based on a third TCI state. The third TCI state may be from the one or more second TCI states. For example, 1508 may be performed by the sidelink TCI MAC-CE component 1940 in FIG. 19. Referring to FIG. 11, at 1120, the second UE may transmit to the first UE, or receive from the first UE, a sidelink message via a sidelink channel based on a third TCI state.

In one configuration, each of the one or more MAC-CEs may include at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals.

In one configuration, the sidelink channel may correspond to one of a PSCCH, a PSSCH, or a PSFCH.

In one configuration, at 1502, the second UE may transmit, to the first UE, the one or more first TCI states via RRC signaling. For example, 1502 may be performed by the sidelink TCI MAC-CE component 1940 in FIG. 19. Referring to FIG. 11, at 1108, the second UE 1104 may transmit, to the first UE 1102, the one or more first TCI states via RRC signaling.

In one configuration, the one or more second TCI states associated with at least one MAC-CE of the one or more MAC-CEs may include a plurality of second TCI states. The plurality of second TCI states may include the third TCI state.

In one configuration, at 1506, the second UE may transmit, to the first UE, an SCI message. The SCI message may be associated with the sidelink message. The SCI message may include an indication of the third TCI state. The indication of the third TCI state may be associated with the at least one MAC-CE. For example, 1506 may be performed by the sidelink TCI MAC-CE component 1940 in FIG. 19. Referring to FIG. 11, at 1116, the second UE 1104 may transmit, to the first UE 1102, an SCI message.

Figure 16:
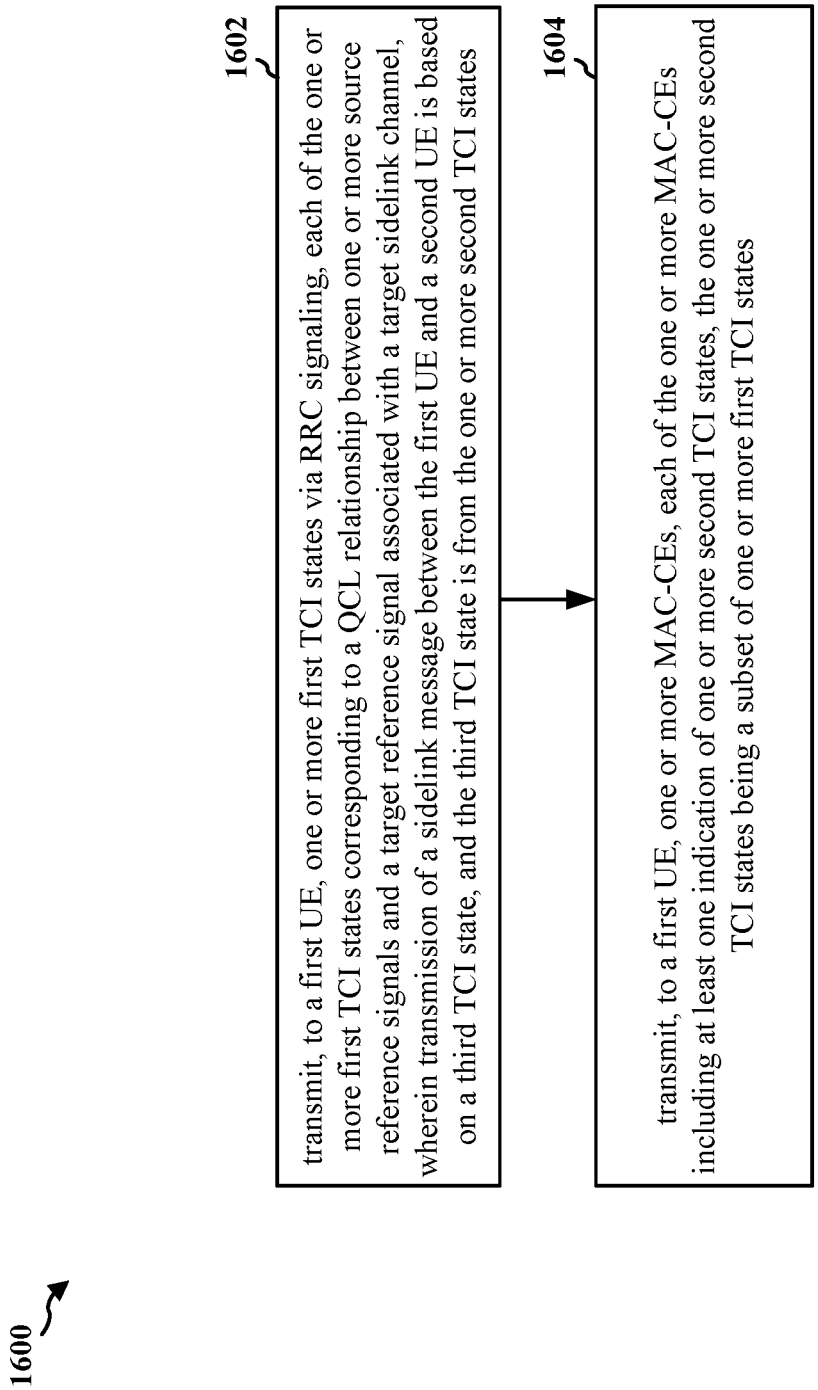
FIG. 16 is a flowchart of a method of wireless communication.

FIG. 16 is a flowchart 1600 of a method of wireless communication. The method may be performed by a base station (e.g., the base station 102/180/310/1106; the apparatus 2002). At 1602, the base station may transmit, to a first UE, one or more first TCI states via RRC signaling. Each of the one or more first TCI states may correspond to a QCL relationship between one or more source reference signals and a target reference signal associated with a target sidelink channel. For example, 1602 may be performed by the sidelink TCI MAC-CE component 2040 in FIG. 20. Referring to FIG. 11, at 1110, the base station 1106 may transmit, to a first UE 1102, one or more first TCI states via RRC signaling.

At 1604, the base station may transmit, to the first UE, one or more MAC-CEs. Each of the one or more MAC-CEs may include at least one indication of one or more second TCI states. The one or more second TCI states may be a subset of one or more first TCI states. Transmission of a sidelink message between the first UE and a second UE may be based on a third TCI state. The third TCI state may be from the one or more second TCI states. For example, 1604 may be performed by the sidelink TCI MAC-CE component 2040 in FIG. 20. Referring to FIG. 11, at 1114, the base station 1106 may transmit, to the first UE 1102, one or more MAC-CEs.

Figure 17:
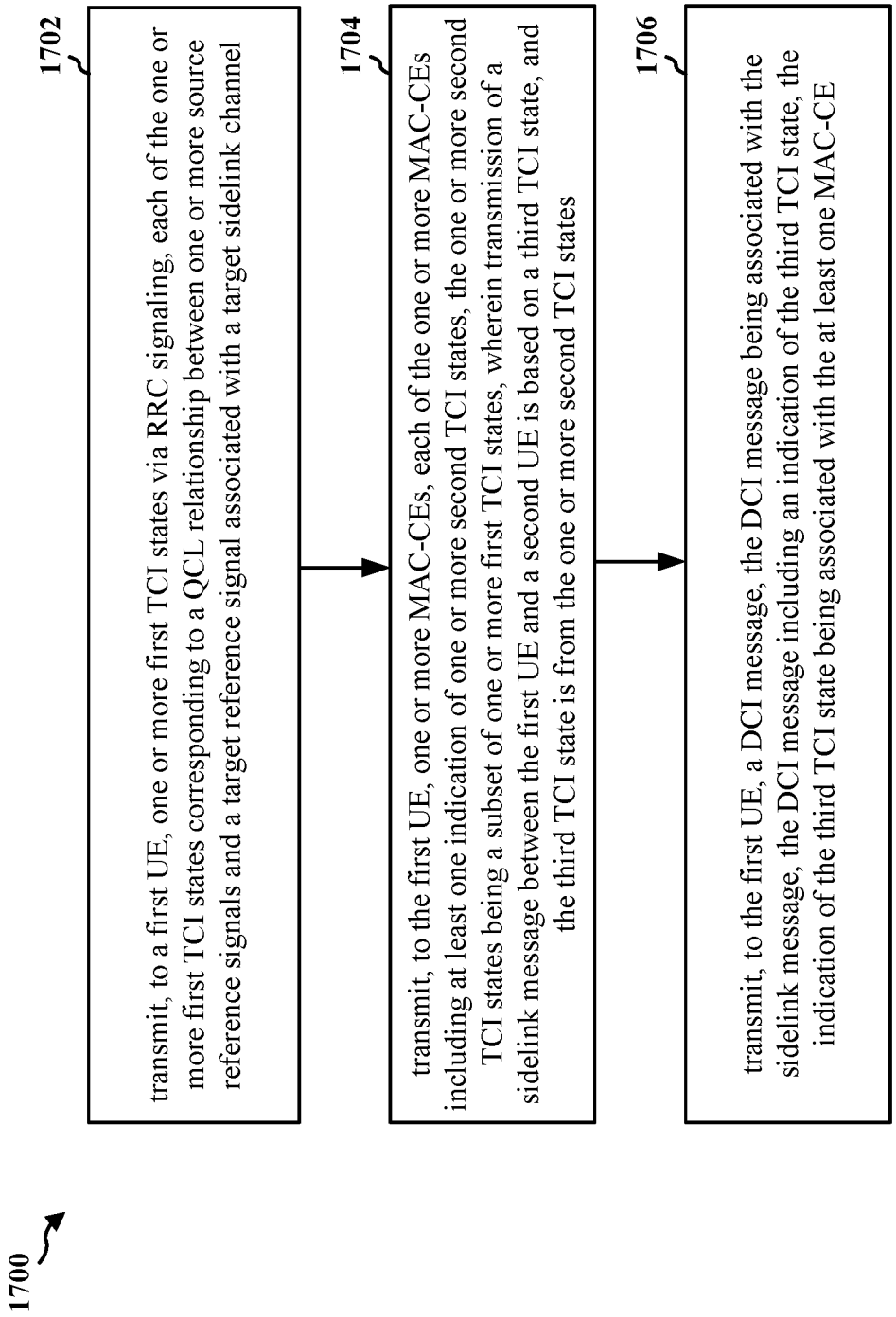
FIG. 17 is a flowchart of a method of wireless communication.

FIG. 17 is a flowchart 1700 of a method of wireless communication. The method may be performed by a base station (e.g., the base station 102/180/310/1106; the apparatus 2002). At 1702, the base station may transmit, to a first UE, one or more first TCI states via RRC signaling. Each of the one or more first TCI states may correspond to a QCL relationship between one or more source reference signals and a target reference signal associated with a target sidelink channel. For example, 1702 may be performed by the sidelink TCI MAC-CE component 2040 in FIG. 20. Referring to FIG. 11, at 1110, the base station 1106 may transmit, to a first UE 1102, one or more first TCI states via RRC signaling.

At 1704, the base station may transmit, to the first UE, one or more MAC-CEs. Each of the one or more MAC-CEs may include at least one indication of one or more second TCI states. The one or more second TCI states may be a subset of one or more first TCI states. Transmission of a sidelink message between the first UE and a second UE may be based on a third TCI state. The third TCI state may be from the one or more second TCI states. For example, 1704 may be performed by the sidelink TCI MAC-CE component 2040 in FIG. 20. Referring to FIG. 11, at 1114, the base station 1106 may transmit, to the first UE 1102, one or more MAC-CEs.

In one configuration, each of the one or more MAC-CEs may include at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals.

In one configuration, the sidelink channel may correspond to one of a PSCCH, a PSSCH, or a PSFCH.

In one configuration, the one or more second TCI states associated with at least one MAC-CE of the one or more MAC-CEs may include a single second TCI state. The single second TCI state may be the third TCI state.

In one configuration, the one or more second TCI states associated with at least one MAC-CE of the one or more MAC-CEs may include a plurality of second TCI states. The plurality of second TCI states may include the third TCI state.

In one configuration, at 1706, the base station may transmit, to the first UE, a DCI message. The DCI message may be associated with the sidelink message. The DCI message may include an indication of the third TCI state. The indication of the third TCI state may be associated with the at least one MAC-CE. For example, 1706 may be performed by the sidelink TCI MAC-CE component 2040 in FIG. 20. Referring to FIG. 11, at 1118, the base station 1106 may transmit, to the first UE 1102, a DCI message.

Figure 18:
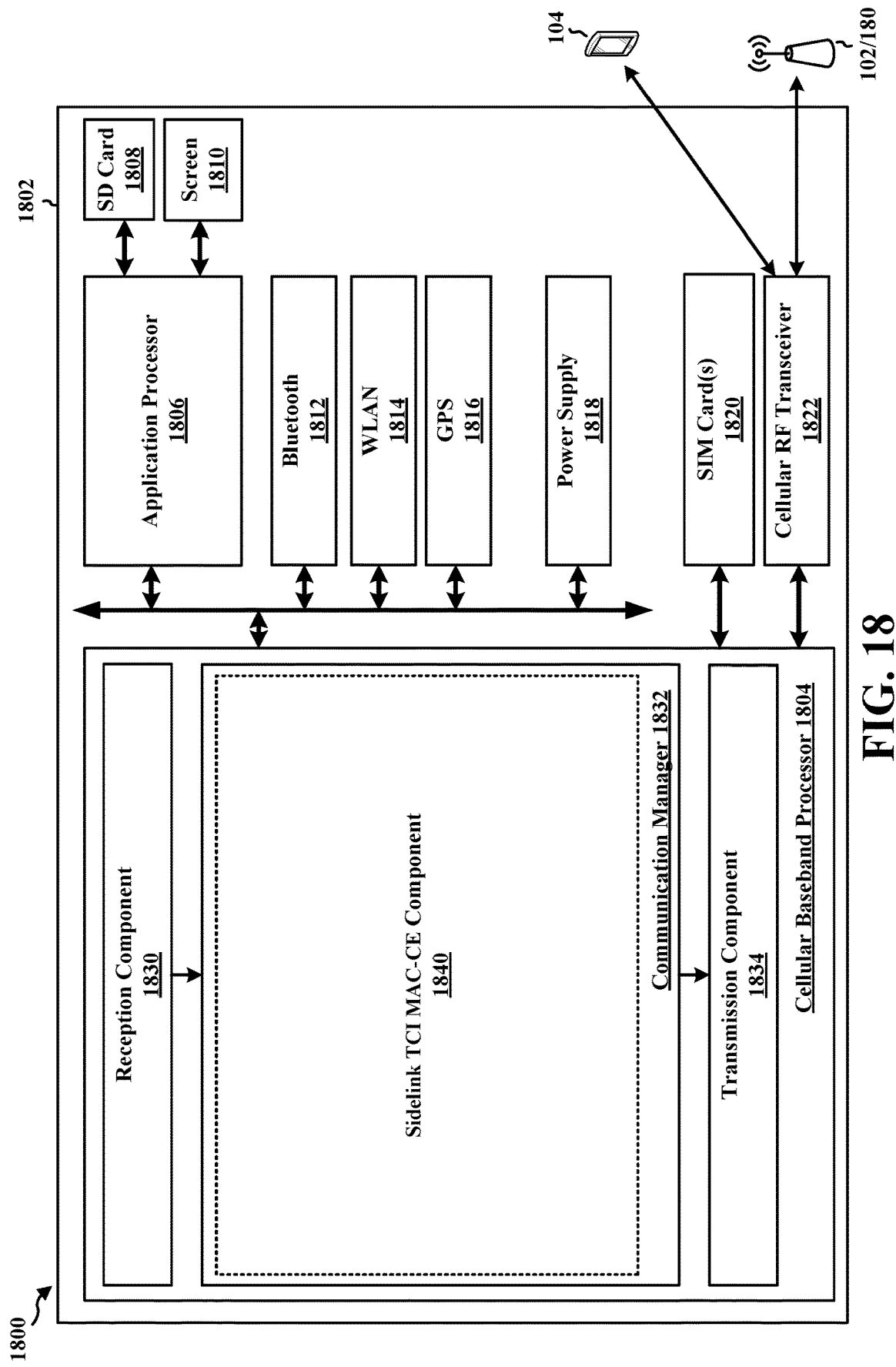
FIG. 18 is a diagram illustrating an example of a hardware implementation for an example apparatus.

FIG. 18 is a diagram 1800 illustrating an example of a hardware implementation for an apparatus 1802. The apparatus 1802 may be a first UE, a component of a first UE, or may implement first UE functionality. In some aspects, the apparatus 1802 may include a cellular baseband processor 1804 (also referred to as a modem) coupled to a cellular RF transceiver 1822. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 may include a sidelink TCI MAC-CE component 1840 that may be configured to receive, from a base station or a second UE, one or more first TCI states via RRC signaling, e.g., as described in connection with 1202 in FIGS. 12 and 1302 in FIG. 13. The sidelink TCI MAC-CE component 1840 may be configured to receive, from the base station or the second UE, one or more MAC-CEs, e.g., as described in connection with 1204 in FIGS. 12 and 1304 in FIG. 13. The sidelink TCI MAC-CE component 1840 may be configured to receive, from the base station or the second UE, a DCI message or an SCI message, respectively, e.g., as described in connection with 1306 in FIG. 13. The sidelink TCI MAC-CE component 1840 may be configured to transmit to the second UE, or receive from the second UE, a sidelink message via a sidelink channel based on a third TCI state, e.g., as described in connection with 1206 in FIGS. 12 and 1308 in FIG. 13.

The apparatus may include additional components that perform each of the blocks of the algorithm in the flowcharts of FIGS. 11-13. As such, each block in the flowcharts of FIGS. 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the cellular baseband processor 1804, includes means for receiving, from a base station or a second UE, one or more first TCI states via RRC signaling. Each of the one or more first TCI states may correspond to a QCL relationship between one or more source reference signals and a target reference signal associated with a target sidelink channel. The apparatus 1802, and in particular the cellular baseband processor 1804, includes means for receiving, from the base station or the second UE, one or more MAC-CEs. Each of the one or more MAC-CEs may include at least one indication of one or more second TCI states. The one or more second TCI states may be a subset of the one or more first TCI states. The apparatus 1802, and in particular the cellular baseband processor 1804, includes means for transmitting to the second UE, or receive from the second UE, a sidelink message via a sidelink channel based on a third TCI state. The third TCI state may be from the one or more second TCI states.

In one configuration, each of the one or more MAC-CEs may include at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals. In one configuration, the sidelink channel may correspond to one of a PSCCH, a PSSCH, or a PSFCH. In one configuration, the one or more second TCI states associated with at least one MAC-CE of the one or more MAC-CEs may include a single second TCI state. The single second TCI state may be the third TCI state. In one configuration, the one or more second TCI states associated with at least one MAC-CE of the one or more MAC-CEs may include a plurality of second TCI states. The plurality of second TCI states may include the third TCI state. In one configuration, the apparatus 1802, and in particular the cellular baseband processor 1804, includes means for receiving, from the base station or the second UE, a DCI message or an SCI message, respectively. The DCI message or the SCI message may be associated with the sidelink message. The DCI message or the SCI message may include an indication of the third TCI state. The indication of the third TCI state may be associated with the at least one MAC-CE. In one configuration, the DCI message or the SCI message may include a communication direction associated with the indication of the third TCI state. In one configuration, at least one MAC-CE of the one or more MAC-CEs may be associated with a single communication direction in relation to one or more target sidelink channels associated with the at least one MAC-CE. The single communication direction may be transmission or reception. In one configuration, at least one MAC-CE of the one or more MAC-CEs may be associated with both communication directions in relation to one or more target sidelink channels associated with the at least one MAC-CE. The both communication directions may be transmission and reception. In one configuration, the one or more second TCI states associated with the at least one MAC-CE may be associated with the both communication directions. In one configuration, the at least one MAC-CE may include, for each indication of the at least one indication of the one or more second TCI states, an indication of a communication direction in relation to a respective target sidelink channel. In one configuration, the at least one indication of the one or more second TCI states included in the at least one MAC-CE may be alternately associated with one or the other of the both communication directions. In one configuration, at least one MAC-CE of the one or more MAC-CEs may be associated with a single target sidelink channel. In one configuration, at least one MAC-CE of the one or more MAC-CEs may be associated with two or more target sidelink channels. In one configuration, the at least one MAC-CE may include, for each of the two or more target sidelink channels, at least one indication of at least one fourth TCI state, the one or more second TCI states may include the at least one fourth TCI state. In one configuration, at least one MAC-CE of the one or more MAC-CEs may be received from the base station, and may be associated with one or more IDs of one or more sidelinks. In one configuration, the one or more IDs of the one or more sidelinks may correspond to one or more IDs of one or more UEs including the second UE and excluding the first UE.

The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 19:
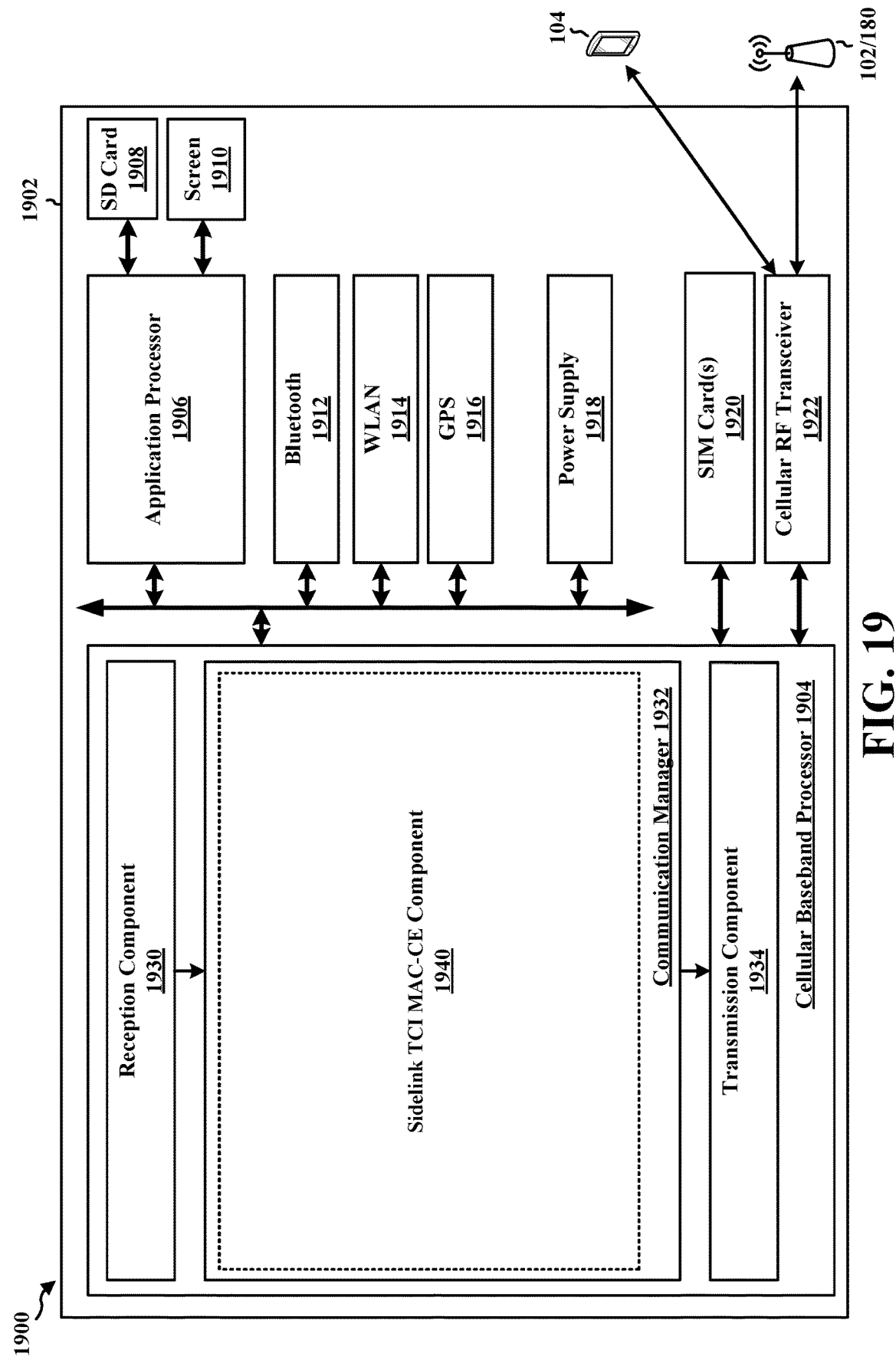
FIG. 19 is a diagram illustrating an example of a hardware implementation for an example apparatus.

FIG. 19 is a diagram 1900 illustrating an example of a hardware implementation for an apparatus 1902. The apparatus 1902 may be a second UE, a component of a second UE, or may implement second UE functionality. In some aspects, the apparatus 1902 may include a cellular baseband processor 1904 (also referred to as a modem) coupled to a cellular RF transceiver 1922. In some aspects, the apparatus 1902 may further include one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, or a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the additional modules of the apparatus 1902.

The communication manager 1932 may include a sidelink TCI MAC-CE component 1940 that may be configured to transmit, to the first UE, the one or more first TCI states via RRC signaling, e.g., as described in connection with 1502 in FIG. 15. The sidelink TCI MAC-CE component 1940 may be configured to transmit, to a first UE, one or more MAC-CEs, e.g., as described in connection with 1402 in FIGS. 14 and 1504 in FIG. 15. The sidelink TCI MAC-CE component 1940 may be configured to transmit, to the first UE, an SCI message, e.g., as described in connection with 1506 in FIG. 15. The sidelink TCI MAC-CE component 1940 may be configured to transmit to the first UE, or receive from the first UE, a sidelink message via a sidelink channel based on a third TCI state, e.g., as described in connection with 1404 in FIGS. 14 and 1508 in FIG. 15.

The apparatus may include additional components that perform each of the blocks of the algorithm in the flowcharts of FIGS. 11, 14, and 15. As such, each block in the flowcharts of FIGS. 11, 14, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the cellular baseband processor 1904, includes means for transmitting, to a first UE, one or more MAC-CEs. Each of the one or more MAC-CEs may include at least one indication of one or more second TCI states. The one or more second TCI states may be a subset of one or more first TCI states. Each of the one or more first TCI states may correspond to a QCL relationship between one or more source reference signals and a target reference signal associated with a target sidelink channel. The apparatus 1902, and in particular the cellular baseband processor 1904, includes means for transmitting to the first UE, or receive from the first UE, a sidelink message via a sidelink channel based on a third TCI state. The third TCI state may be from the one or more second TCI states.

In one configuration, each of the one or more MAC-CEs may include at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals. In one configuration, the sidelink channel may correspond to one of a PSCCH, a PSSCH, or a PSFCH. In one configuration, the apparatus 1902, and in particular the cellular baseband processor 1904, includes means for transmitting, to the first UE, the one or more first TCI states via RRC signaling. In one configuration, the one or more second TCI states associated with at least one MAC-CE of the one or more MAC-CEs may include a plurality of second TCI states. The plurality of second TCI states may include the third TCI state. In one configuration, the apparatus 1902, and in particular the cellular baseband processor 1904, includes means for transmitting, to the first UE, an SCI message. The SCI message may be associated with the sidelink message. The SCI message may include an indication of the third TCI state. The indication of the third TCI state may be associated with the at least one MAC-CE.

The means may be one or more of the components of the apparatus 1902 configured to perform the functions recited by the means. As described supra, the apparatus 1902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 20:
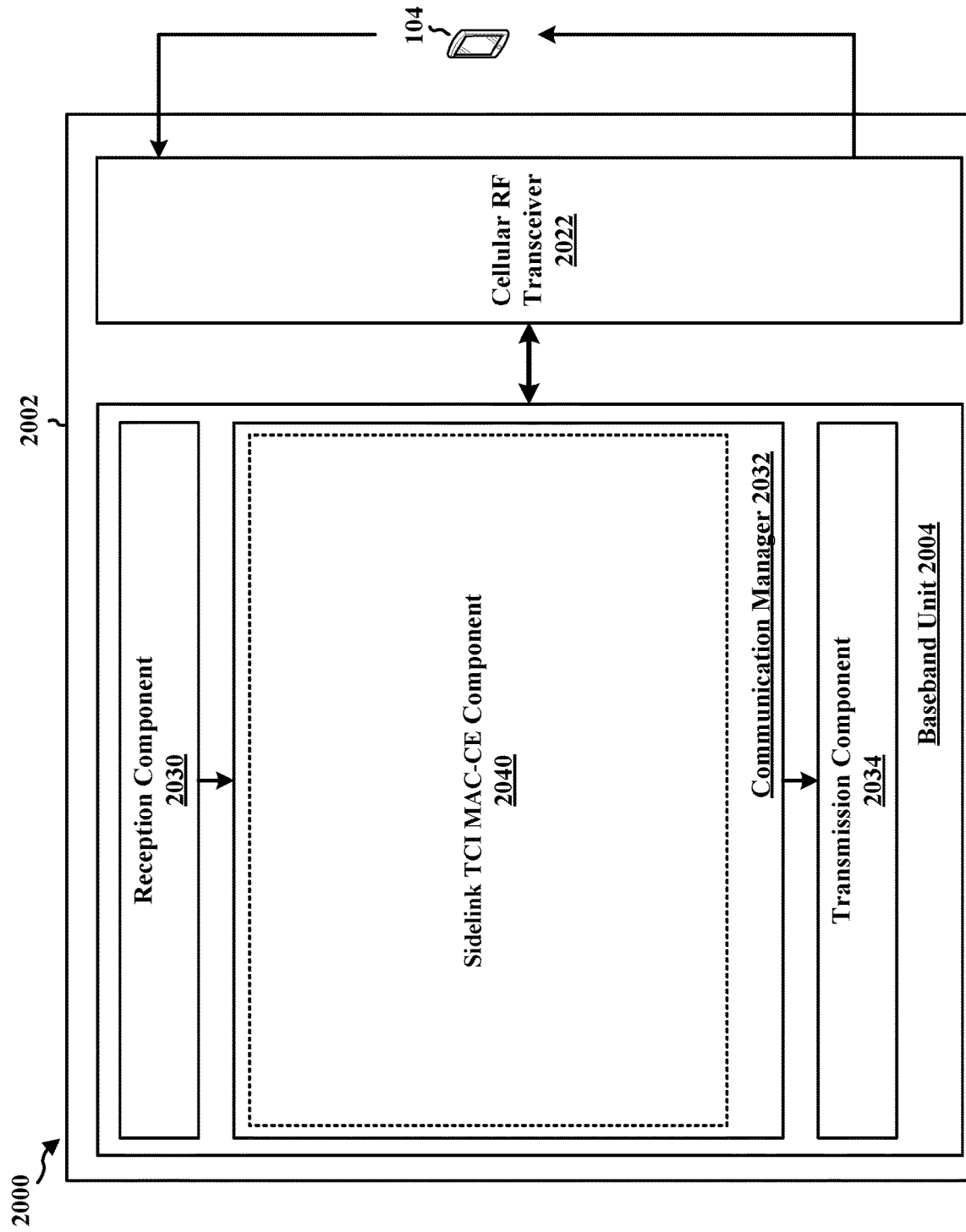
FIG. 20 is a diagram illustrating an example of a hardware implementation for an example apparatus.

FIG. 20 is a diagram 2000 illustrating an example of a hardware implementation for an apparatus 2002. The apparatus 2002 may be a base station, a component of a base station, or may implement base station functionality. In some aspects, the apparatus 2002 may include a baseband unit 2004. The baseband unit 2004 may communicate through a cellular RF transceiver 2022 with the UE 104. The baseband unit 2004 may include a computer-readable medium/memory. The baseband unit 2004 is responsible for general processing, including the execution of software stored on the computer-readable medium/memory. The software, when executed by the baseband unit 2004, causes the baseband unit 2004 to perform the various functions described supra. The computer-readable medium/memory may also be used for storing data that is manipulated by the baseband unit 2004 when executing software. The baseband unit 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband unit 2004. The baseband unit 2004 may be a component of the base station 310 and may include the memory 376 and/or at least one of the TX processor 316, the RX processor 370, and the controller/processor 375.

The communication manager 2032 may include a sidelink TCI MAC-CE component 2040 that may be configured to transmit, to a first UE, one or more first TCI states via RRC signaling, e.g., as described in connection with 1602 in FIGS. 16 and 1702 in FIG. 17. The sidelink TCI MAC-CE component 2040 may be configured to transmit, to the first UE, one or more MAC-CEs, e.g., as described in connection with 1604 in FIGS. 16 and 1704 in FIG. 17. The sidelink TCI MAC-CE component 2040 may be configured to transmit, to the first UE, a DCI message, e.g., as described in connection with 1706 in FIG. 17.

The apparatus may include additional components that perform each of the blocks of the algorithm in the flowcharts of FIGS. 11, 16, and 17. As such, each block in the flowcharts of FIGS. 11, 16, and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the baseband unit 2004, includes means for transmitting, to a first UE, one or more first TCI states via RRC signaling. Each of the one or more first TCI states may correspond to a QCL relationship between one or more source reference signals and a target reference signal associated with a target sidelink channel. The apparatus 2002, and in particular the baseband unit 2004, includes means for transmitting, to the first UE, one or more MAC-CEs. Each of the one or more MAC-CEs may include at least one indication of one or more second TCI states. The one or more second TCI states may be a subset of one or more first TCI states. Transmission of a sidelink message between the first UE and a second UE may be based on a third TCI state. The third TCI state may be from the one or more second TCI states.

In one configuration, each of the one or more MAC-CEs may include at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals. In one configuration, the sidelink channel may correspond to one of a PSCCH, a PSSCH, or a PSFCH. In one configuration, the one or more second TCI states associated with at least one MAC-CE of the one or more MAC-CEs may include a single second TCI state. The single second TCI state may be the third TCI state. In one configuration, the one or more second TCI states associated with at least one MAC-CE of the one or more MAC-CEs may include a plurality of second TCI states. The plurality of second TCI states may include the third TCI state. In one configuration, the apparatus 2002, and in particular the baseband unit 2004, includes means for transmitting, to the first UE, a DCI message. The DCI message may be associated with the sidelink message. The DCI message may include an indication of the third TCI state. The indication of the third TCI state may be associated with the at least one MAC-CE.

The means may be one or more of the components of the apparatus 2002 configured to perform the functions recited by the means. As described supra, the apparatus 2002 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIG. 5A-17, a first UE may receive, from a base station or a second UE, one or more first TCI states via RRC signaling. The first UE may receive, from the base station or the second UE, one or more MAC-CEs. Each of the one or more MAC-CEs may include at least one indication of one or more second TCI states. The one or more second TCI states may be a subset of the one or more first TCI states. The first UE may transmit to the second UE, or receive from the second UE, a sidelink message via a sidelink channel based on a third TCI state. The third TCI state may be from the one or more second TCI states. Accordingly, one or more TCI states may be indicated or activated/deactivated for one or more target sidelink channels for one or more sidelinks via a MAC-CE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to receive, from a base station or a second UE, one or more first TCI states via RRC signaling, each of the one or more first TCI states corresponding to a QCL relationship between one or more source reference signals and a target reference signal associated with a target sidelink channel; receive, from the base station or the second UE, one or more MAC-CEs, each of the one or more MAC-CEs including at least one indication of one or more second TCI states, the one or more second TCI states being a subset of the one or more first TCI states; and transmit to the second UE, or receive from the second UE, a sidelink message via a sidelink channel based on a third TCI state, the third TCI state being from the one or more second TCI states.

Aspect 2 is the apparatus of aspect 1, where each of the one or more MAC-CEs includes at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals.

Aspect 3 is the apparatus of any of aspects 1 and 2, where the sidelink channel corresponds to one of a PSCCH, a PSSCH, or a PSFCH.

Aspect 4 is the apparatus of any of aspects 1 to 3, where the one or more second TCI states associated with at least one MAC-CE of the one or more MAC-CEs include a single second TCI state, and the single second TCI state is the third TCI state.

Aspect 5 is the apparatus of any of aspects 1 to 3, where the one or more second TCI states associated with at least one MAC-CE of the one or more MAC-CEs include a plurality of second TCI states, the plurality of second TCI states including the third TCI state.

Aspect 6 is the apparatus of aspect 5, the at least one processor being further configured to: receive, from the base station or the second UE, a DCI message or an SCI message, respectively, the DCI message or the SCI message being associated with the sidelink message, the DCI message or the SCI message including an indication of the third TCI state, the indication of the third TCI state being associated with the at least one MAC-CE.

Aspect 7 is the apparatus of aspect 6, where the DCI message or the SCI message includes a communication direction associated with the indication of the third TCI state.

Aspect 8 is the apparatus of aspect 1, where at least one MAC-CE of the one or more MAC-CEs is associated with a single communication direction in relation to one or more target sidelink channels associated with the at least one MAC-CE, the single communication direction being transmission or reception.

Aspect 9. The apparatus of aspect 1, where at least one MAC-CE of the one or more MAC-CEs is associated with both communication directions in relation to one or more target sidelink channels associated with the at least one MAC-CE, the both communication directions being transmission and reception.

Aspect 10 is the apparatus of aspect 9, where the one or more second TCI states associated with the at least one MAC-CE are associated with the both communication directions.

Aspect 11 is the apparatus of aspect 9, where the at least one MAC-CE includes, for each indication of the at least one indication of the one or more second TCI states, an indication of a communication direction in relation to a respective target sidelink channel.

Aspect 12 is the apparatus of aspect 9, where the at least one indication of the one or more second TCI states included in the at least one MAC-CE is alternately associated with one or the other of the both communication directions.

Aspect 13 is the apparatus of any of aspects 1 to 12, where at least one MAC-CE of the one or more MAC-CEs is associated with a single target sidelink channel.

Aspect 14 is the apparatus of any of aspects 1 to 12, where at least one MAC-CE of the one or more MAC-CEs is associated with two or more target sidelink channels.

Aspect 15 is the apparatus of aspect 14, where the at least one MAC-CE includes, for each of the two or more target sidelink channels, at least one indication of at least one fourth TCI state, the one or more second TCI states including the at least one fourth TCI state.

Aspect 16 is the apparatus of any of aspects 1 to 15, where at least one MAC-CE of the one or more MAC-CEs is received from the base station, and is associated with one or more IDs of one or more sidelinks.

Aspect 17 is the apparatus of aspect 16, where the one or more IDs of the one or more sidelinks correspond to one or more IDs of one or more UEs including the second UE and excluding the first UE.

Aspect 18 is the apparatus of any of aspects 1 to 17, further including a transceiver coupled to the at least one processor.

Aspect 19 is an apparatus for wireless communication at a second UE including at least one processor coupled to transmit, to a first UE, one or more MAC-CEs, each of the one or more MAC-CEs including at least one indication of one or more second TCI states, the one or more second TCI states being a subset of one or more first TCI states, each of the one or more first TCI states corresponding to a QCL relationship between one or more source reference signals and a target reference signal associated with a target sidelink channel; and transmit to the first UE, or receive from the first UE, a sidelink message via a sidelink channel based on a third TCI state, the third TCI state being from the one or more second TCI states.

Aspect 20 is the apparatus of aspect 19, where each of the one or more MAC-CEs includes at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals.

Aspect 21 is the apparatus of any of aspects 19 and 20, where the sidelink channel corresponds to one of a PSCCH, a PSSCH, or a PSFCH.

Aspect 22 is the apparatus of any of aspects 19 to 21, the at least one processor being further configured to: transmit, to the first UE, the one or more first TCI states via RRC signaling.

Aspect 23 is the apparatus of any of aspects 19 to 22, where the one or more second TCI states associated with at least one MAC-CE of the one or more MAC-CEs include a plurality of second TCI states, the plurality of second TCI states including the third TCI state.

Aspect 24 is the apparatus of aspect 23, the at least one processor being further configured to: transmit, to the first UE, an SCI message, the SCI message being associated with the sidelink message, the SCI message including an indication of the third TCI state, the indication of the third TCI state being associated with the at least one MAC-CE.

Aspect 25 is the apparatus of any of aspects 19 to 24, further including a transceiver coupled to the at least one processor.

Aspect 26 is an apparatus for wireless communication at a base station including at least one processor coupled to transmit, to a first UE, one or more first TCI states via RRC signaling, each of the one or more first TCI states corresponding to a QCL relationship between one or more source reference signals and a target reference signal associated with a target sidelink channel; and transmit, to the first UE, one or more MAC-CEs, each of the one or more MAC-CEs including at least one indication of one or more second TCI states, the one or more second TCI states being a subset of one or more first TCI states, where transmission of a sidelink message between the first UE and a second UE is based on a third TCI state, and the third TCI state is from the one or more second TCI states.

Aspect 27 is the apparatus of aspect 26, where each of the one or more MAC-CEs includes at least one of an ID of a cell, an ID of a BWP, an ID of a resource pool, one or more indications of one or more target sidelink channels, one or more indications of one or both communication directions in relation to the one or more target sidelink channels, or one or more indications of one or more source reference signals.

Aspect 28 is the apparatus of any of aspects 26 and 27, where the sidelink channel corresponds to one of a PSCCH, a PSSCH, or a PSFCH.

Aspect 29 is the apparatus of any of aspects 26 to 28, where the one or more second TCI states associated with at least one MAC-CE of the one or more MAC-CEs include a single second TCI state, and the single second TCI state is the third TCI state.

Aspect 30 is the apparatus of any of aspects 26 to 28, where the one or more second TCI states associated with at least one MAC-CE of the one or more MAC-CEs include a plurality of second TCI states, the plurality of second TCI states including the third TCI state.

Aspect 31 is the apparatus of aspect 30, the at least one processor being further configured to: transmit, to the first UE, a DCI message, the DCI message being associated with the sidelink message, the DCI message including an indication of the third TCI state, the indication of the third TCI state being associated with the at least one MAC-CE.

Aspect 32 is the apparatus of any of aspects 26 to 31, further including a transceiver coupled to the at least one processor.

Aspect 33 is a method of wireless communication for implementing any of aspects 1 to 32.

Aspect 34 is an apparatus for wireless communication including means for implementing any of aspects 1 to 32.

Aspect 35 is a computer-readable medium storing computer executable code, where the code when executed by a processor causes the processor to implement any of aspects 1 to 32.

What is claimed is:

1. An apparatus for wireless communication at a first user equipment (UE), including:
    a memory; and
    at least one processor coupled to the memory and configured to:
        receive, from a base station or a second UE, one or more first transmission configuration indicator (TCI) states via radio resource control (RRC) signaling, each of the one or more first TCI states corresponding to a quasi co-location (QCL) relationship between one or more source reference signals and a target reference signal associated with a target sidelink channel;
        receive, from the base station or the second UE, one or more medium access control (MAC)-control elements (CEs) (MAC-CEs), each of the one or more MAC-CEs including at least one indication of one or more second TCI states, the one or more second TCI states being a subset of the one or more first TCI states, wherein at least one MAC-CE of the one or more MAC-CEs is associated with two or more target sidelink channels, and wherein the at least one MAC-CE includes, for each of the two or more target sidelink channels, at least one indication of at least one third TCI state, the one or more second TCI states including the at least one third TCI state; and
        transmit to the second UE, or receive from the second UE, a sidelink message via a sidelink channel based on a fourth TCI state, the fourth TCI state being from the one or more second TCI states.

2. The apparatus of claim 1, wherein each of the one or more MAC-CEs includes at least one of an identifier (ID) of a cell, an ID of a bandwidth part (BWP), an ID of a resource pool, one or more indications of one or more target sidelink channels, one or more indications of one or both communication directions in relation to the one or more target sidelink channels, or one or more indications of one or more source reference signals.

3. The apparatus of claim 1, wherein the sidelink channel corresponds to one of a physical sidelink control channel (PSCCH), a physical sidelink shared channel (PSSCH), or a physical sidelink feedback channel (PSFCH).

4. The apparatus of claim 1, wherein the one or more second TCI states associated with at least one MAC-CE of the one or more MAC-CEs include a single second TCI state, and the single second TCI state is the fourth TCI state.

5. The apparatus of claim 1, wherein the one or more second TCI states associated with at least one MAC-CE of the one or more MAC-CEs include a plurality of second TCI states, the plurality of second TCI states including the fourth TCI state.

6. The apparatus of claim 5, the at least one processor being further configured to:
    receive, from the base station or the second UE, a downlink control information (DCI) message or a sidelink control information (SCI) message, respectively, the DCI message or the SCI message being associated with the sidelink message, the DCI message or the SCI message including an indication of the fourth TCI state, the indication of the fourth TCI state being associated with the at least one MAC-CE.

7. The apparatus of claim 6, wherein the DCI message or the SCI message includes a communication direction associated with the indication of the fourth TCI state.

8. The apparatus of claim 1, wherein at least one MAC-CE of the one or more MAC-CEs is associated with a single communication direction in relation to one or more target sidelink channels associated with the at least one MAC-CE, the single communication direction being transmission or reception.

9. The apparatus of claim 1, wherein at least one MAC-CE of the one or more MAC-CEs is associated with both communication directions in relation to one or more target sidelink channels associated with the at least one MAC-CE, the both communication directions being transmission and reception.

10. The apparatus of claim 9, wherein the one or more second TCI states associated with the at least one MAC-CE are associated with the both communication directions.

11. The apparatus of claim 9, wherein the at least one MAC-CE includes, for each indication of the at least one indication of the one or more second TCI states, an indication of a communication direction in relation to a respective target sidelink channel.

12. The apparatus of claim 9, wherein the at least one indication of the one or more second TCI states included in the at least one MAC-CE is alternately associated with one or the other of the both communication directions.

13. The apparatus of claim 1, wherein at least one MAC-CE of the one or more MAC-CEs is associated with a single target sidelink channel.

14. The apparatus of claim 1, wherein at least one MAC-CE of the one or more MAC-CEs is received from the base station, and is associated with one or more identifiers (IDs) of one or more sidelinks.

15. The apparatus of claim 14, further including a transceiver coupled to the at least one processor, wherein the one or more IDs of the one or more sidelinks correspond to one or more IDs of one or more UEs including the second UE and excluding the first UE.

16. A method of wireless communication at a first user equipment (UE), comprising:
    receiving, from a base station or a second UE, one or more first transmission configuration indicator (TCI) states via radio resource control (RRC) signaling, each of the one or more first TCI states corresponding to a quasi co-location (QCL) relationship between one or more source reference signals and a target reference signal associated with a target sidelink channel;
    receiving, from the base station or the second UE, one or more medium access control (MAC)-control elements (CEs) (MAC-CEs), each of the one or more MAC-CEs including at least one indication of one or more second TCI states, the one or more second TCI states being a subset of the one or more first TCI states, wherein at least one MAC-CE of the one or more MAC-CEs is associated with two or more target sidelink channels, and wherein the at least one MAC-CE includes, for each of the two or more target sidelink channels, at least one indication of at least one third TCI state, the one or more second TCI states including the at least one third TCI state; and transmitting to the second UE, or receive from the second UE, a sidelink message via a sidelink channel based on a fourth TCI state, the fourth TCI state being from the one or more second TCI states.

17. An apparatus for wireless communication at a second user equipment (UE), including:
a memory; and
at least one processor coupled to the memory and configured to:
transmit, to a first UE, one or more medium access control (MAC)-control elements (CEs) (MAC-CEs), each of the one or more MAC-CEs including at least one indication of one or more second transmission configuration indicator (TCI) states, the one or more second TCI states being a subset of one or more first TCI states, each of the one or more first TCI states corresponding to a quasi co-location (QCL) relationship between one or more source reference signals and a target reference signal associated with a target sidelink channel, wherein at least one MAC-CE of the one or more MAC-CEs is associated with two or more target sidelink channels, and wherein the at least one MAC-CE includes, for each of the two or more target sidelink channels, at least one indication of at least one third TCI state, the one or more second TCI states including the at least one third TCI state; and
transmit to the first UE, or receive from the first UE, a sidelink message via a sidelink channel based on a fourth TCI state, the fourth TCI state being from the one or more second TCI states.

18. The apparatus of claim 17, wherein each of the one or more MAC-CEs includes at least one of an identifier (ID) of a cell, an ID of a bandwidth part (BWP), an ID of a resource pool, one or more indications of one or more target sidelink channels, one or more indications of one or both communication directions in relation to the one or more target sidelink channels, or one or more indications of one or more source reference signals.

19. The apparatus of claim 17, wherein the sidelink channel corresponds to one of a physical sidelink control channel (PSCCH), a physical sidelink shared channel (PSSCH), or a physical sidelink feedback channel (PSFCH).

20. The apparatus of claim 17, the at least one processor being further configured to:
transmit, to the first UE, the one or more first TCI states via radio resource control (RRC) signaling.

21. The apparatus of claim 17, wherein the one or more second TCI states associated with at least one MAC-CE of the one or more MAC-CEs include a plurality of second TCI states, the plurality of second TCI states including the fourth TCI state.

22. The apparatus of claim 21, further including a transceiver coupled to the at least one processor, the at least one processor being further configured to:
transmit, to the first UE, a sidelink control information (SCI) message, the SCI message being associated with the sidelink message, the SCI message including an indication of the fourth TCI state, the indication of the fourth TCI state being associated with the at least one MAC-CE.

23. An apparatus for wireless communication at a base station, including:
a memory; and
at least one processor coupled to the memory and configured to:
transmit, to a first user equipment (UE), one or more first transmission configuration indicator (TCI) states via radio resource control (RRC) signaling, each of the one or more first TCI states corresponding to a quasi co-location (QCL) relationship between one or more source reference signals and a target reference signal associated with a target sidelink channel; and
transmit, to the first UE, one or more medium access control (MAC)-control elements (CEs) (MAC-CEs), each of the one or more MAC-CEs including at least one indication of one or more second TCI states, the one or more second TCI states being a subset of one or more first TCI states, wherein at least one MAC-CE of the one or more MAC-CEs is associated with two or more target sidelink channels, and wherein the at least one MAC-CE includes, for each of the two or more target sidelink channels, at least one indication of at least one third TCI state, the one or more second TCI states including the at least one third TCI state, and wherein transmission of a sidelink message between the first UE and a second UE is based on a fourth TCI state, and the fourth TCI state is from the one or more second TCI states.

24. The apparatus of claim 23, wherein each of the one or more MAC-CEs includes at least one of an identifier (ID) of a cell, an ID of a bandwidth part (BWP), an ID of a resource pool, one or more indications of one or more target sidelink channels, one or more indications of one or both communication directions in relation to the one or more target sidelink channels, or one or more indications of one or more source reference signals.

25. The apparatus of claim 23, wherein the sidelink channel corresponds to one of a physical sidelink control channel (PSCCH), a physical sidelink shared channel (PSSCH), or a physical sidelink feedback channel (PSFCH).

26. The apparatus of claim 23, wherein the one or more second TCI states associated with at least one MAC-CE of the one or more MAC-CEs include a single second TCI state, and the single second TCI state is the fourth TCI state.

27. The apparatus of claim 23, wherein the one or more second TCI states associated with at least one MAC-CE of the one or more MAC-CEs include a plurality of second TCI states, the plurality of second TCI states including the fourth TCI state.

28. The apparatus of claim 27, the at least one processor being further configured to:
transmit, to the first UE, a downlink control information (DCI) message, the DCI message being associated with the sidelink message, the DCI message including an indication of the fourth TCI state, the indication of the fourth TCI state being associated with the at least one MAC-CE.

\* \* \* \* \*